US012732318B2

(12) United States Patent
Jeong et al.

(10) Patent No.: US 12,732,318 B2
(45) Date of Patent: Sep. 8, 2026

(54) APPARATUS AND METHOD FOR REMOVING E2 INTERFACE-RELEVANT INFORMATION IN RADIO ACCESS NETWORK

(71) Applicant: Samsung Electronics Co., Ltd., Suwon-si (KR)

(72) Inventors: Jiwoong Jeong, Suwon-si (KR); Youngsung Kho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 18/540,079

(22) Filed: Dec. 14, 2023

(65) Prior Publication Data

US 2024/0121049 A1 Apr. 11, 2024

Related U.S. Application Data

(63) Continuation of application No. PCT/KR2022/011487, filed on Aug. 3, 2022.

(30) Foreign Application Priority Data

Aug. 3, 2021 (KR) ........................ 10-2021-0102248

(51) Int. Cl.

*H04L 5/00* (2006.01)
*H04W 76/10* (2018.01)
*H04W 76/30* (2018.01)

(52) U.S. Cl.

CPC ........... *H04L 5/0048* (2013.01); *H04W 76/10* (2018.02); *H04W 76/30* (2018.02)

(58) Field of Classification Search

CPC ....... H04L 5/0048; H04L 67/12; H04L 67/30; H04L 67/535; H04W 76/30; H04W 76/10;

(Continued)

(56) References Cited

U.S. PATENT DOCUMENTS

2014/0247765 A1 9/2014 Baghel et al.
2021/0184989 A1 6/2021 Wu et al.

(Continued)

FOREIGN PATENT DOCUMENTS

CN 113163414 A 7/2021
EP 3 855 844 A1 7/2021

(Continued)

OTHER PUBLICATIONS

WO_2021176092_A1 (Year: 2021).*
Australian Office Action dated Nov. 12, 2024, issued in Australian Application No. 2022322684.
Russian Decision on Grant dated Dec. 2, 2024, issued in Russian Application No. 2024105279.

(Continued)

*Primary Examiner* — Rushil P. Sampat
(74) *Attorney, Agent, or Firm* — Jefferson IP Law, LLP

(57) ABSTRACT

A method performed by a near-Real Time (RT) Radio Access Network (RAN) Intelligent Controller (RIC) is provided. The method includes receiving, from an E2 node, an E2 removal request message for removing a connection between the near-RT RIC and the E2 node through an E2 interface, and transmitting, to the E2 node, an E2 removal response message through the E2 interface, in which the E2 node includes an O-RAN distributed unit (O-DU), an O-RAN central unit-control plane (O-CU-CP), an O-RAN central unit-user plane (O-CU-UP), or a base station that communicates with the near-RT RIC via the E2 interface, and the E2 interface provided for communication between the near-RT RIC and the E2 node supports an E2 application protocol (E2AP) for communication over the E2 interface.

18 Claims, 17 Drawing Sheets

(58) Field of Classification Search
CPC ......... H04W 4/08; H04W 8/186; H04W 4/70; H04W 48/02
See application file for complete search history.

(56) References Cited

U.S. PATENT DOCUMENTS

| | | | | |
|---|---|---|---|---|
| 2021/0235451 | A1* | 7/2021 | Parekh | H04W 72/04 |
| 2022/0240067 | A1 | 7/2022 | Song et al. | |
| 2022/0286536 | A1* | 9/2022 | Singh | H04W 40/246 |
| 2022/0303831 | A1 | 9/2022 | Song et al. | |
| 2023/0110387 | A1* | 4/2023 | Urie | H04W 8/186<br>455/418 |

FOREIGN PATENT DOCUMENTS

| | | | |
|---|---|---|---|
| KR | 10-2021-0043474 | A | 4/2021 |
| RU | 2 599 048 | C2 | 10/2016 |
| WO | 2021/048831 | A1 | 3/2021 |
| WO | 2021/071325 | A1 | 4/2021 |
| WO | 2021/118281 | A1 | 6/2021 |

OTHER PUBLICATIONS

Japanese Notice of Patent Grant dated Jan. 14, 2025, issued in Japanese Application No. 2024-506803.

Bharath Balasubramanian et al., RIC: A RAN Intelligent Controller Platform for AI-Enabled Cellular Networks, Theme Article: AI-Powered 5G Services, IEEE, Mar. 11, 2021.

O-RAN Working Group 3, Near-Real-time RAN Intelligent Controller, E2 Application Protocol (E2AP), O-RAN.WG3.E2AP-v01.01, Oct. 31, 2020.

O-RAN Working Group 3 Near-Real-time RAN Intelligent Controller Near-RT RIC Architecture, ORAN.WG3.RICARCH-v02.00, Jun. 30, 2021.

Thoralf Czichy et al., 5G RAN optimization using the O-RAN software community's RIC (RAN Intelligent Controller), Sep. 23, 2019.

International Search Report dated Nov. 16, 2022, issued in International Application No. PCT/KR2022/011487.

O-RAN Working Group 3, Near-Real-time RAN Intelligent Controller, E2 Application Protocol (E2AP), O-RAN.WG3.E2AP-v02.00.02, Apr. 21, 2021.

O-RAN Working Group 3, Near-Real-time RAN Intelligent Controller, Architecture & E2 General Aspects and Principles, O-RAN.WG3.E2GAP-v01.01, Oct. 1, 2020.

O-RAN Working Group 3, Near-Real-time RAN Intelligent Controller, Near-RT RIC Architecture, O-RAN.WG3.RICARCH-v01.01, Oct. 31, 2020.

Russian Office Action dated Jul. 24, 2024, issued in Russian Application No. 2024105279.

European Search Report dated Oct. 9, 2024, issued in European Application No. 22853463.2.

Russian Decision on Grant dated Jun. 6, 2025, issued in Russian Application No. 2025101915.

Australian Notice of Acceptance dated Feb. 19, 2025, issued in Australian Application No. 2022322684.

Japanese Notice of Patent Grant dated Nov. 4, 2025, issued in Japanese Patent Application No. JP2025-020810.

Singapore Search Report with Written Opinion dated Jan. 30, 2026, issued in Singapore Patent Application No. 11202400777V.

European Office Action dated Jul. 29, 2026, issued in European Patent Application No. 22853463.2.

* cited by examiner

APPARATUS AND METHOD FOR REMOVING E2 INTERFACE-RELEVANT INFORMATION IN RADIO ACCESS NETWORK

CROSS-REFERENCE TO RELATED APPLICATION(S)

This application is a continuation application, claiming priority under § 365(c), of an International application No. PCT/KR2022/011487, filed on Aug. 3, 2022, which is based on and claims the benefit of a Korean patent application number 10-2021-0102248, filed on Aug. 3, 2021, in the Korean Intellectual Property Office, the disclosure of which is incorporated by reference herein in its entirety.

TECHNICAL FIELD

The disclosure relates to an apparatus and method for removing E2 interface-relevant information in a radio access network. More particularly, the disclosure relates to an apparatus and method for removing an E2 node-relevant configuration, Radio Access Network (RAN) Intelligent Controller (RIC)-relevant configuration, or E2 interface configuration conforming to an Open Radio Access Network (O-RAN) standard of a wireless communication system.

BACKGROUND ART $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple input multiple output (MIMO) for mitigating radio-wave path loss and increasing radio-wave transmission distances in millimeter wave (mmWave), supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, New Radio (NR) User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an apparatus and method for removing E2 interface-relevant information in a wireless communication system.

Additional aspects will be set forth in part in the description which follows and, in part, will be apparent from the description, or may be learned by practice of the presented embodiments.

Technical Solution

In accordance with an aspect of the disclosure, a method performed by a near-Real Time (RT) Radio Access Network (RAN) Intelligent Controller (RIC) is provided. The method includes receiving, from an E2 node, an E2 removal request message for removing a connection between the near-RT RIC and the E2 node through an E2 interface, and transmitting, to the E2 node, an E2 removal response message through the E2 interface, wherein the E2 node comprises an O-RAN distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

In accordance with another aspect of the disclosure, a method performed by an E2 node in the wireless communication system is provided. The method includes transmitting, to a near-Real Time (RT) radio access network (RAN) intelligent controller (RIC), an E2 removal request message for removing a connection between the near-RT RIC and the E2 node through an E2 interface, and receiving, from the near-RT RIC, an E2 removal response message through the E2 interface, wherein the E2 node comprises an O-RAN distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

In accordance with another aspect of the disclosure, a near-real time (RT) radio access network (RAN) intelligent controller (RIC) in a wireless communication system is provided. The near-RT RIC includes a transceiver, one or more processors, and memory storing instructions that, when executed by the one or more processors, cause the near-RT RIC to receive, from an E2 node, an E2 removal request message for removing a connection between the near-RT RIC and the E2 node through an E2 interface, and transmit, to the E2 node, an E2 removal response message through the E2 interface, wherein the E2 node comprises an O-RAN distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

In accordance with another aspect of the disclosure, an E2 node in a wireless communication system is provided. The E2 node includes a transceiver, one or more processors, and memory storing instructions that, when executed by the one or more processors, cause the E2 node to transmit, to a near-Real Time (RT) radio access network (RAN) intelligent controller (RIC), an E2 removal request message for removing a connection between the near-RT RIC and the E2 node through an E2 interface, and receive, from the near-RT RIC, an E2 removal response message through the E2 interface, wherein the E2 node comprises an O-RAN distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

In accordance with another aspect of the disclosure, one or more non-transitory computer-readable recording media storing a program including instructions that, when executed by one or more processors of a near-Real Time (RT) radio access network (RAN) intelligent controller (RIC) in a wireless communication system, cause the near-RT RIC to perform operations are provided. The operations include receiving, from an E2 node, an E2 removal request message for removing a connection between the near-RT RIC and the E2 node through an E2 interface, and transmitting, to the E2 node, an E2 removal response message through the E2 interface, wherein the E2 node comprises an O-RAN distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

In accordance with another aspect of the disclosure, one or more non-transitory computer-readable recording media storing a program including instructions that, when executed by one or more processors of an E2 node in a wireless communication system, cause the E2 node to perform operations are provided. The operations include transmitting, to a near-Real Time (RT) radio access network (RAN) intelligent controller (RIC), an E2 removal request message for removing a connection between the near-RT RIC and the E2 node through an E2 interface, and receiving, from the near-RT RIC, an E2 removal response message through the E2 interface, wherein the E2 node comprises an O-RAN distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

Advantageous Effects

An apparatus and method according to embodiments of the disclosure remove an E2 node-relevant configuration in a Near-Real-Time (NRT) Radio Access Network (RAN) Intelligent Controller (RIC) when an E2 node is terminated, thereby allowing the NRT RIC to function effectively.

An apparatus and method according to embodiments of the disclosure remove an NRT RIC-relevant configuration in an E2 node when an NRT RIC is terminated, thereby allowing the E2 node to function effectively.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR INVENTION

Figure 1:
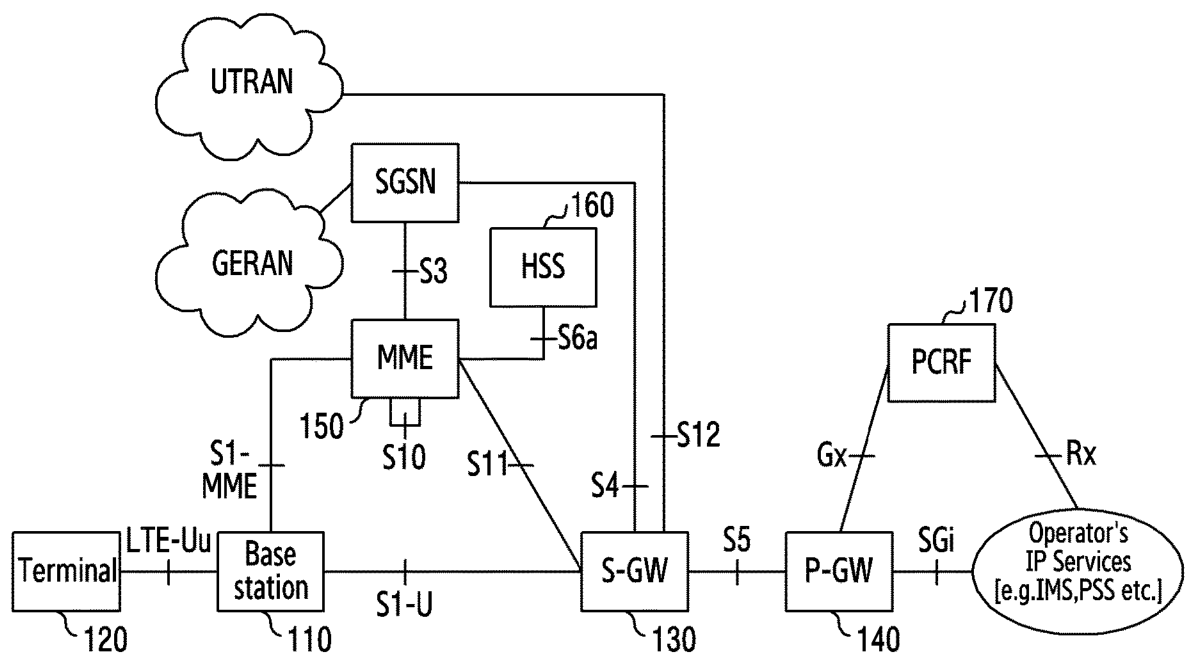
FIG. 1 illustrates an example of a $4^{th}$ Generation (4G) Long Term Evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Hereinafter, the disclosure relates to a control procedure between a device in a Radio Access Network (RAN) and a device for controlling the RAN in a wireless communication system. Specifically, the disclosure relates to a procedure, message, and method in which an RAN Intelligent Controller (RIC) transmits an RIC control request message to an E2 node on an E2 interface in a radio access network, and confirms whether the RIC control request is correctly achieved by the E2 node or fails, and if it fails, confirms a reason thereof.

In the following description, terms referring to a signal, a channel, control information, network entities, and components of a device, or the like are used for convenience of explanation. Therefore, the disclosure is not limited to the terms described below, and thus other terms having the same technical meaning may also be used.

In addition, although an expression 'greater than' or 'less than' is used in the disclosure to determine whether a specific condition is satisfied (or fulfilled), this is for purposes only and does not exclude an expression of 'greater than or equal to' or 'less than or equal to'. A condition described as "greater than or equal to" may be replaced with "greater than". A condition described as "less than or equal to" may be replaced with "less than". A condition described as "greater than or equal to and less than" may be replaced with "greater than and less than or equal to".

In addition, although the disclosure describes various embodiments by using terms used in some communication standards (e.g., $3^{rd}$ Generation Partnership Project (3GPP), Open-Radio Access Network (O-RAN)), this is for purposes only. Various embodiments of the disclosure may be easily modified and applied to other communication systems.

Since a $4^{th}$ Generation (4G)/$5^{th}$ Generation (5G) communication system (e.g., New Radio (NR)) has currently been commercialized, it is required to support a user-specific service in a virtualized network. The 3GPP is a joint research project between mobile communication-relevant organizations and is aiming at creating a 3G mobile communication system standard, applicable worldwide, within the scope of the IMT-2000 project of the International Telecommunication Union (ITU). The 3GPP was established in December 1998. The 3GPP standard is based on the advanced global system for mobile communications (GSM) standard, and includes radio and core networks and a service architecture within the scope of standardization. Accordingly, an Open Radio Access Network (O-RAN) has newly defined a Radio Unit (RU), a Distributed Unit (DU), a Central Unit (CU)-Control Plane (CP), and a CU-User Plane (UP), which are nodes constituting a 3GPP Network Entity (NE) and base station, respectively as an O-RAN (O)-RU, an O-DU, an O-CU-CP, and an O-CU-UP. In addition thereto, a Near-Real-Time (NRT) Radio access network Intelligent Controller (RIC) has been standardized. The disclosure is to support an operator specific service model in an E2 interface in which an RIC requests the O-DU, the O-CU-CP, or the O-CU-UP to provide a service. Herein, the O-RU, the O-DU, the O-CU-CP, and the O-CU-UP may be understood as objects constituting an RAN which may operate according to the O-RAN standard, and may be referred to as an E2 node. An interface with the objects constituting the RAN which may operate according to the O-RAN standard between the RIC and the E2 nodes uses an E2 Application Protocol (AP) (E2AP).

The RIC is a logical node capable of collecting information in a cell site in which a terminal performs transmission/reception with respect to the O-DU, O-CU-CP, or O-CU-UP. The RIC may be realized in the form of a server deployed in one physical place in a concentrated manner. A connection between the O-DU and the RIC, between the O-CU-CP and the RIC, and between the O-CU-UP and the RIC may be established through the Ethernet. To this end, an interface standard for communication between the O-DU and the RIC, between the O-CU-CP and the RIC, and between the O-CU-UP and the RIC is required, and a message standard such as E2-DU, E2-CU-CP, and E2-CU-UP is required to define a procedure between the RIC and the O-DU, O-CU-CP, and O-CU-UP. In particular, a user-specific service is required in a virtualized network, and there is a need to define a function of a message of the O-DU, O-CU-CP, O-CU-UP, and RIC to support a service for wide cell coverage by allowing a call processing message/function generated in the O-RAN to be concentrated in the RIC.

The RIC may communicate with the O-DU, the O-CU-CP, and the O-CU-UP by using the E2 interface, and may set an event occurrence condition by generating and transmitting a subscription message. Specifically, the RIC may generate an E2 subscription request message, and may transfer the message to the E2 node (e.g., O-CU-CP, O-CU-UP, O-DU) to set a call processing event. In addition, after setting the event, the E2 node transmits a subscription request response message transferred to the RIC.

The E2 node may transmit a current status to the RIC through an E2 indication/report. The RIC may provide control for the O-DU, O-CU-CP, and O-CU-UP by using an E2 control message. Various embodiments of the disclosure propose an E2 indication message transmitted as measurement information on a User Equipment (UE) basis, for each period set in the subscription event condition in the O-DU. In addition, various embodiments of the disclosure propose a message for controlling a resource transmitted from the RIC to the O-DU.

FIG. 1 illustrates an example of a $4^{th}$ Generation (4G) Long Term Evolution (LTE) core system according to an embodiment of the disclosure.

Referring to FIG. 1, the LTE core system includes a base station 110, a terminal 120, a Serving Gateway (S-GW) 130, a Packet data network Gateway (P-GW) 140, a Mobility Management Entity (MME) 150, a Home Subscription Server (HSS) 160, and a Policy and Charging Rule Function (PCRF) 170.

The base station 110 is a network infrastructure which provides a radio access to the terminal 120. For example, the base station 110 is a device which performs scheduling by collecting state information such as a buffer state, available transmit power, channel state, or the like of the terminal 120. The base station 110 has coverage defined as a specific geographic region, based on a distance at which a signal is transmittable. The base station 110 is coupled to the MME 150 through an S1-MME interface. The base station 110 may be referred to as not only the base station but also an Access Point (AP), an evolved NodeB (eNodeB, eNB), a wireless point, a Transmission/Reception Point (TRP), or other terms having equivalent technical meanings.

The terminal 120 is a device used by a user, and performs communication through a wireless channel with respect to the base station 110. Optionally, the terminal 120 may operate without a user's involvement. That is, at least one of the terminal 120 and S-GW 130 is a device which performs Machine Type Communication (MTC), and may not be carried by a user. The terminal 120 may be referred to as not only the terminal but also a User Equipment (UE), a mobile station (MS), a subscriber station, a Customer-Premises Equipment (CPE), a remote terminal, a wireless terminal, a user device, or other terms having equivalent technical meanings.

The S-GW 130 provides a data bearer, and creates or removes the data bearer under the control of the MME 150. For example, the S-GW 130 processes a packet arrived from the base station 110 or a packet to be forwarded to the base station 110. In addition, the S-GW 130 may perform an anchoring role when the terminal 120 performs a handover between base stations. The P-GW 140 may function as a connectivity point with respect to an external network (e.g., an Internet network). In addition, the P-GW 140 allocates an Internet Protocol (IP) address to the terminal 120, and performs an anchoring role for the S-GW 130. In addition, the P-GW 140 applies a Quality of Service (QoS) policy of the terminal 120, and may manage account data.

The MME 150 manages mobility of the terminal 120. In addition, the MME 150 may perform authentication, bearer management, or the like for the terminal 120. That is, the MME 150 is responsible for mobility management and a variety of control functions. The MME 150 may interwork with a Serving general packet radio service (GPRS) Support Node (SGSN).

The HSS 160 stores a subscriber profile and key information for authentication of the terminal 120. The subscriber profile and the key information are transferred from the HSS 160 to the MME 150 when the terminal 120 accesses the network.

The PCRF 170 defines policy and charging rules. The stored information is transferred from the PCRF 170 to the P-GW 140, and the P-GW 140 may provide control (e.g., QoS management, charging, etc.) to the terminal 120, based on information provided from the PCRF 170.

Carrier aggregation ('CA) is a technology in which a plurality of component carriers are aggregated so that one terminal transmits/receives a signal by using the plurality of component carriers simultaneously, thereby increasing frequency usage efficiency in terms of the terminal or the base station. Specifically, according to the CA technology, the terminal and the base station may use the plurality of component carriers in each of an Uplink (UL) and a Downlink (DL) to transmit/receive a broadband signal. In this case, each of the component carriers is located at a different frequency band. Hereinafter, the UL denotes a communication link on which the terminal transmits a signal to the base station, and the DL denotes a communication link on which the base station transmits a signal to the terminal. In this case, the number of UL component carriers and the number of DL component carriers may be different from each other.

A dual connectivity or multi connectivity technology is a technology in which one terminal is coupled to a plurality of different base stations to transmit/receive a signal by simultaneously using carriers in each of the plurality of base stations located at different frequency bands, thereby increasing frequency usage efficiency in terms of the terminal or the base station. The terminal may transmit/receive traffic by being coupled simultaneously to a first base station (e.g., a base station which provides a service by using an LTE technology or a 4G mobile communication technology) and a second base station (e.g., a base station which provides a service by using a New Radio (NR) technology or a 5G mobile communication technology). In this case, a frequency resource used by each base station may be located at a different band. A scheme which operates based on the dual connectivity technology of the LTE and the NR may be called a 5G Non-Stand Alone (NSA).

Figure 2A:
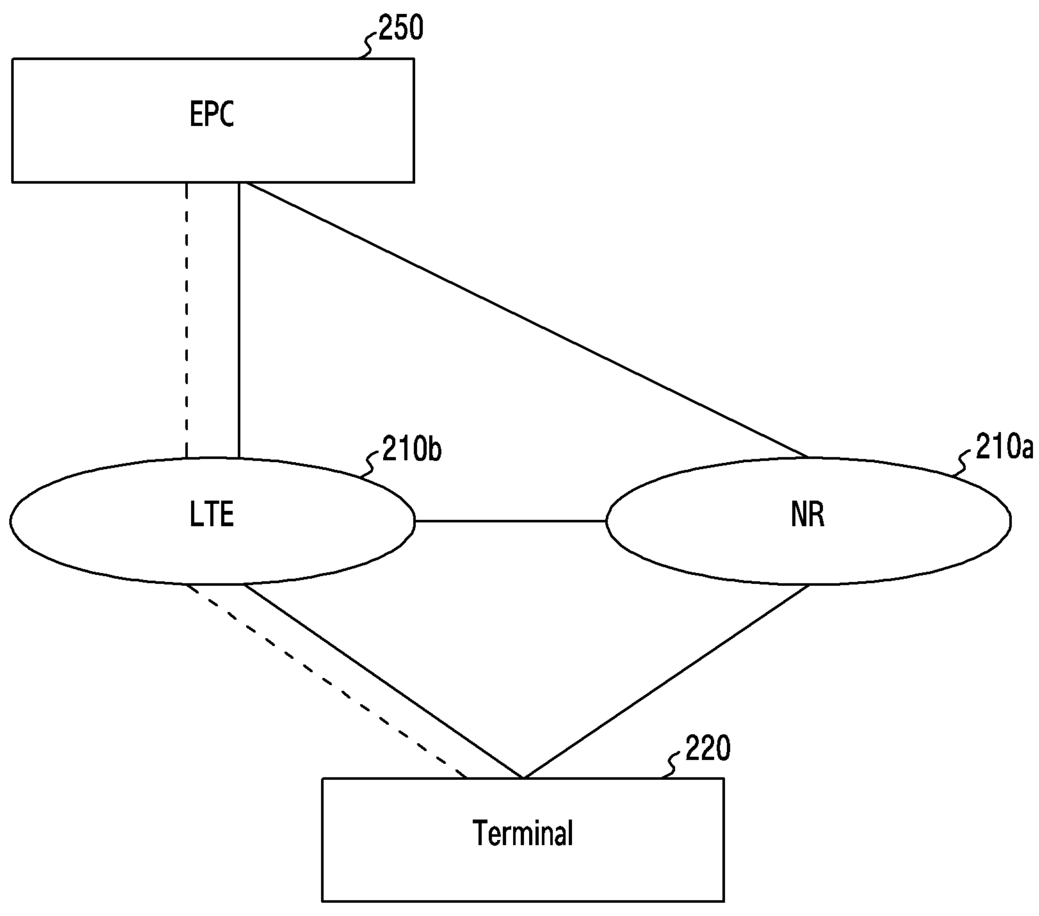
FIG. 2A illustrates an example of a $5^{th}$ Generation (5G) Non-Stand Alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210*a*, an LTE RAN 210*b*, a terminal 220, and an Evolved Packet Core (EPC) 250. The NR RAN 210*a* and the LTE RAN 210*b* may be coupled to the EPC 250, and the terminal 220 may receive a service from any one of, or simultaneously both, the NR RAN 210*a* and the LTE RAN 210*b*. The NR RAN 210*a* includes at least one NR base station, and the LTE RAN 210*b* includes at least one LTE base station. Herein, the NR base station may be referred to as a '$5^{th}$ generation node', a 'next generation NodeB (gNB)', or other terms having equivalent technical meanings. In addition, the NR base station may have a structure divided into a Central Unit (CU) and a Digital Unit (DU), and the CU may have a structure divided into a CU-Control Plane (CP) unit and a CU-User Plane (UP) unit.

In the structure of FIG. 2A, the terminal 220 may perform Radio Resource Control (RRC) access through a first base station (e.g., a base station belonging to the LTE RAN 210*b*), and may be provided a service of a function (e.g., connectivity management, mobility management, etc.) provided in a control plane. In addition, the terminal 220 may be provided an additional radio resource for transmitting/receiving data through a second base station (e.g., a base station belonging to the NR RAN 210*a*). The dual connectivity technology using the LTE and NR may be referred to as Evolved Universal Terrestrial Radio Access (E-URAN)-NR Dual Connectivity (DC) (EN-DC). Similarly, the dual connectivity technology in which the first base station uses the NR technology and the second base station uses the LTE technology is referred to as NR-E-UTRA Dual Connectivity (NE-DC). In addition, various embodiments may be applied to various types of multi connectivity and carrier aggregation technologies. In addition, various embodiments may also be applied to a case where a first system using a first communication technology and a second system using a second communication technology are implemented in one device or a case where the first base station and the second base station are located at the same geographic position.

Figure 2B:
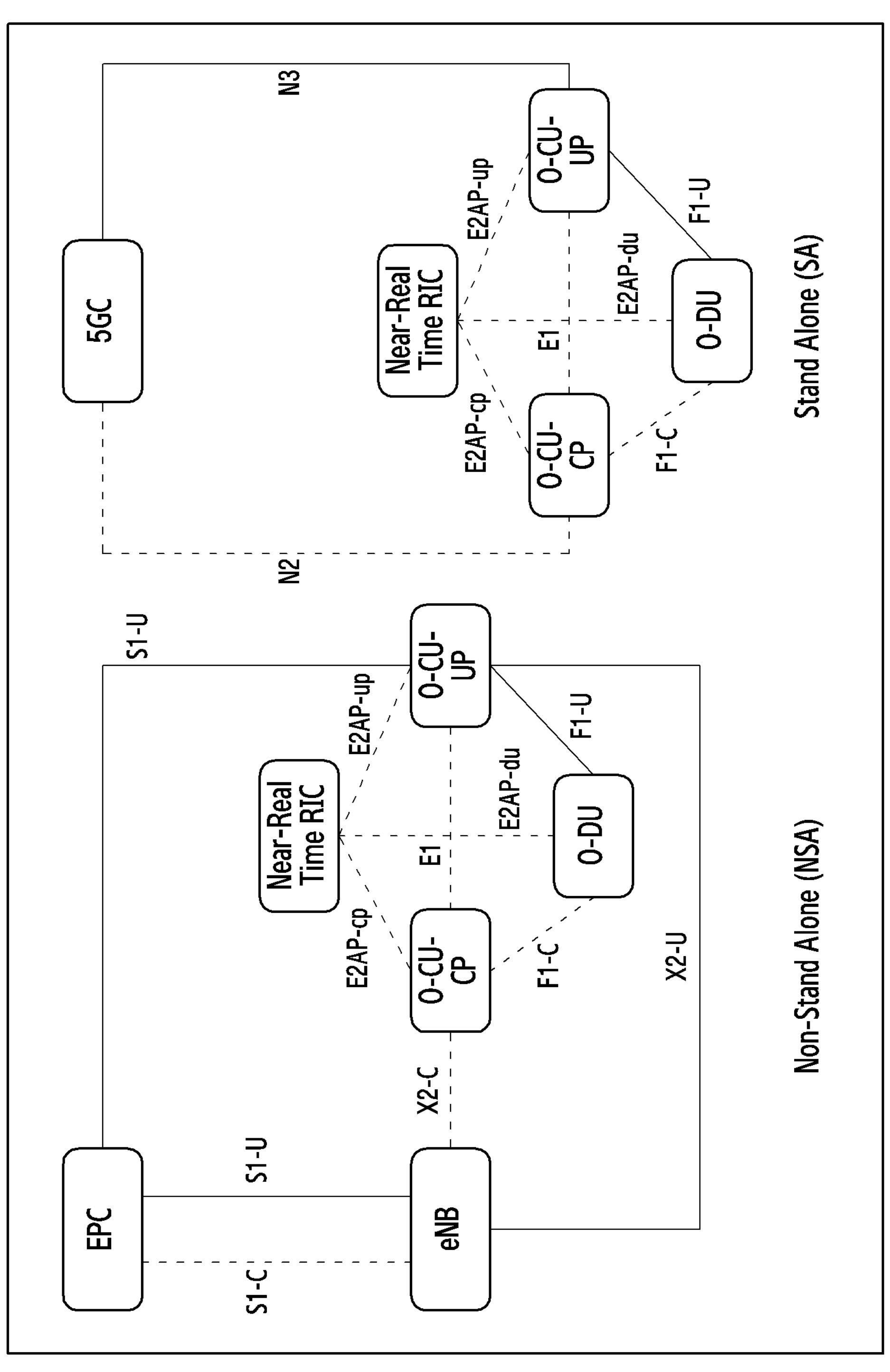
FIG. 2B illustrates an example of an architecture for an Open-Radio Access Network (O-RAN) according to an embodiment of the disclosure.

FIG. 2B illustrates an example of an architecture for an O-RAN according to an embodiment of the disclosure.

For the purpose of E2-SM-Key Performance Indicator (KPI) Monitoring (KPIMON) of an E2 service model, an O-RAN non-standalone mode in a multi-connectivity operation using an E-UTRA and NR radio access technology may be considered. Meanwhile, it may be assumed that an E2 node is in an O-RAN standalone mode.

Referring to FIG. 2B, in the deployment of the O-RAN standalone mode, an eNB is coupled to an EPC through an S1-C/S1-U interface, and is coupled to an O-CU-CP through an X2 interface. The O-CU-CP for the deployment of the O-RAN standalone mode may be coupled to a 5G Core (5GC) through an N2/N3 interface.

Figure 3:
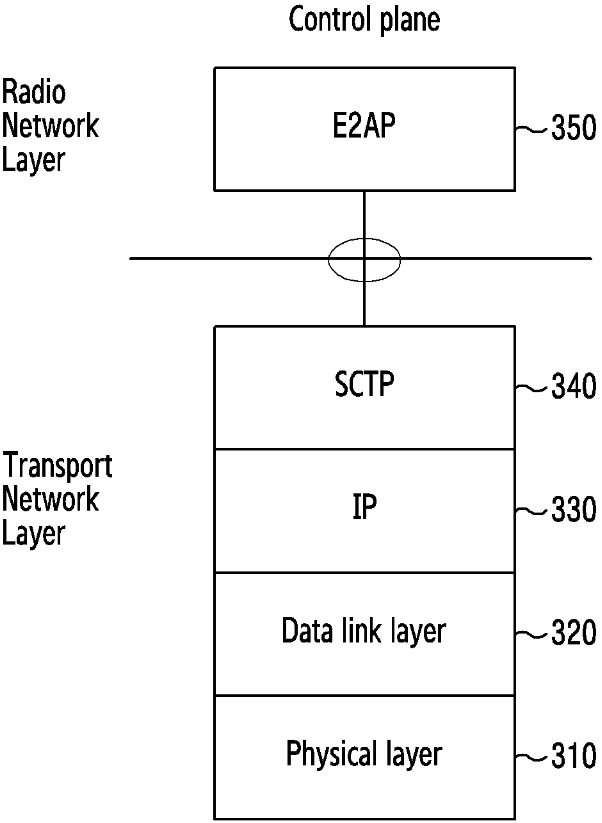
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an Internet Protocol (IP) 330, and a Stream Control Transmission Protocol (SCTP) 340.

The radio network layer includes an E2AP 350. The E2AP 350 is used to transfer a subscription message, an indication message, a control message, a service update message, and a service query message, and is transmitted in a higher layer of the SCTP 340 and IP 330.

Figure 4:
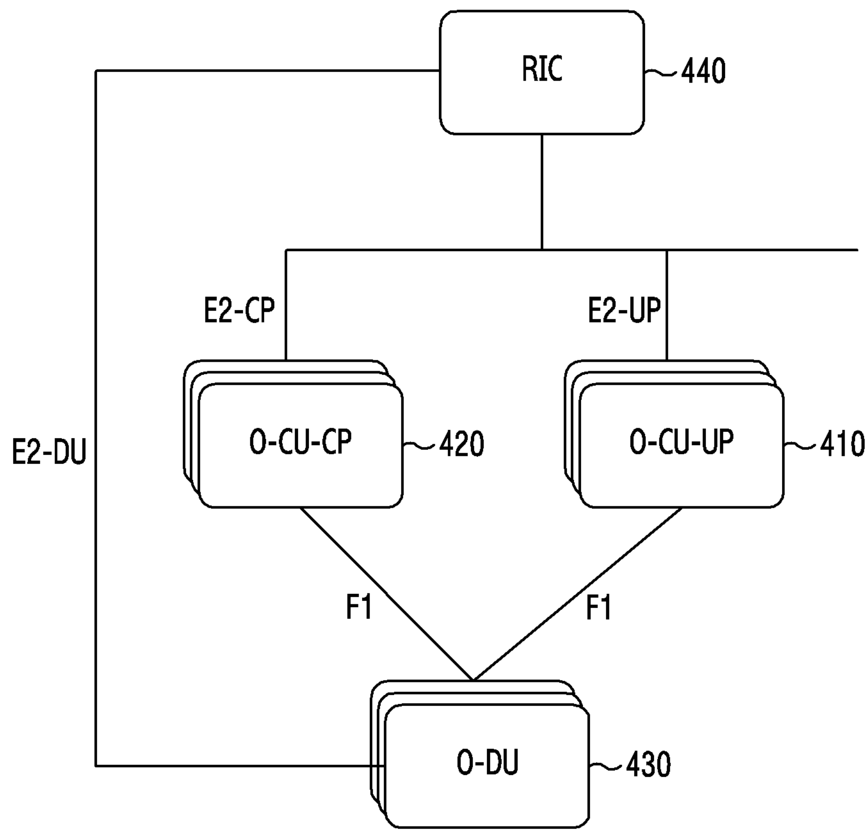
FIG. 4 illustrates an example of a connection between a base station and a Radio access network Intelligence Controller (RIC) in a radio access network according to an embodiment of the disclosure.

FIG. 4 illustrates an example of a connection between a base station and an RIC in a radio access network according to an embodiment of the disclosure.

Referring to FIG. 4, an RIC 440 is coupled to an O-CU-CP 420, an O-CU-UP 410, and an O-DU 430. The RIC 440 is a device for customizing RAN functionality for a new service or regional resource optimization. The RIC 440 may provide a function such as network intelligence (e.g., policy enforcement, handover optimization), resource assurance (e.g., radio-link management, advanced Self-Organized Network (SON)), resource control (e.g., load balancing, slicing policy), or the like. The RIC 440 may perform communication with the O-CU-CP 420, the O-CU-UP 410, and the O-DU 430. The RIC 440 may be coupled to each node through E2-CP, E2-UP, and E2-DU interfaces. In addition, an interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

Although one RIC 440 is illustrated in FIG. 4 for example, a plurality of RICs may be present according to various embodiments. The plurality of RICs may be implemented with a plurality of hardware entities located at the same physical position or may be implemented through virtualization using one hardware entity.

Figure 5:
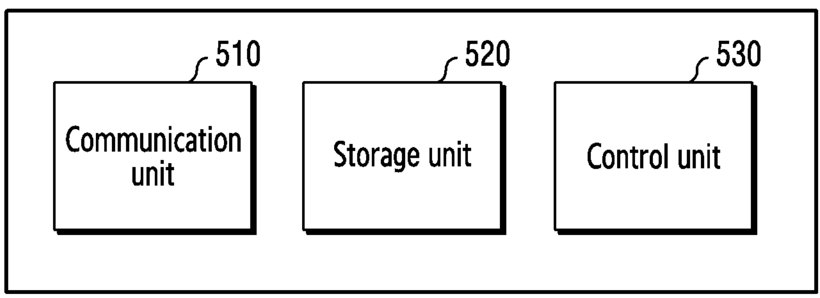
FIG. 5 illustrates a structure of a device in a radio access network according to an embodiment of the disclosure.

FIG. 5 illustrates a structure of a device according to an embodiment of the disclosure.

The structure of FIG. 5 may be understood as a structure of a device which performs at least one function among the near-RT RIC, non-RT RIC, O-CU-CP, O-CU-UP, and O-DU of FIG. 4. Hereinafter, the term '. . . unit', '. . . device', or the like implies a unit of processing at least one function or operation, and may be implemented in hardware or software or in combination of the hardware and the software.

Referring to FIG. 5, a core network device includes a communication unit 510, a storage unit 520, and a control unit 530.

The communication unit 510 provides an interface for preforming communication with different nodes in a network. That is, the communication unit 510 converts a bit-stream transmitted from the core network device to a different device, and converts a physical signal received from the different device into a bit-stream. That is, the communication unit 510 may transmit and receive a signal. Accordingly, the communication unit 510 may be referred to as a transmitter, a receiver, or a transceiver. In this case, the communication unit 510 may allow the core network device to communication with other devices or systems via a backhaul connection (e.g., a wired backhaul or a wireless backhaul).

The storage unit 520 (for example, memory) stores a basic program, application program, setup information, or the like for an operation of the core network device. The storage unit 520 may be constructed of volatile memory, non-volatile memory, or a combination of the volatile memory and the non-volatile memory. In addition, the storage unit 520 provides the stored data at the request of the control unit 530. Memory may include high-speed random access memory and also includes non-volatile memory, such as one or more magnetic disk storage devices, flash memory devices, or other non-volatile solid-state memory devices. In some examples, one of more non-transitory computer-readable storage media of memory is used to store instructions (e.g., for performing aspects of operations described herein) for use by or in connection with the one or more processors, which can fetch and execute the instructions. The memory may be distributed among different types of memory, with any given type being singular or plural memory. Different memory may be used by, or associated with, a different at least one of the one or more processors.

The control unit 530 controls overall operations of the core network device. For example, the control unit 530 transmits and receives a signal via the communication unit 510. In addition, the control unit 530 writes data to the storage unit 520, and reads the data. For this, the control unit 530 may include one or more processors. The one or more processors may include a radio frequency (RF) processor, and a base band processor. The RF processor may perform a function of transmitting or receiving a signal via a wireless channel, such as band conversion and amplification of a signal. The baseband processor may execute a function of converting between a baseband signal and a bit string according to the physical layer standard of a system, for example, in the case of data transmission, the baseband processor may produce complex symbols by encoding and modulating a transmission bit string. Additionally, The processor may execute various instructions of one or more programs that may be loaded into memory to perform various operations of the device and to process data. The processor may be a symmetric multi-processor system containing multiple processors of the same type. The processor may include a central processing unit (CPU), a microprocessor, an application specific integrated circuit (ASIC), a field programmable gate arrays (FPGAs), an application processor (AP), a digital signal processor (DSP), a communication processor (CP) together with an RF processor, and the base band processor. The processor may be a set of one or more processors or may be a multi-processor core, depending on the particular implementation. Here the set of one or more processors may include one or more microprocessor, an application specific integrated circuit (ASIC), a field programmable gate arrays (FPGAs), an application processor (AP), a digital signal processor (DSP), a communication processor (CP), one or more of an application processor (e.g. a central processing unit (CPU)), a communication processor (e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, or the like. The device may perform operations based collectively on different processors of the one or more processors executing different instructions of the one or more programs. Further, the processor may be implemented using one or more heterogeneous processor systems in which a main processor is present with secondary processors on a single chip. As another illustrative example, the processor may be a symmetric multi-processor system containing multiple processors of the same type. Memory may include one or more computer-readable storage media. The computer-readable storage media are, for example, tangible and non-transitory. According to various embodiments, the control unit 530 may control the core network device to perform operations in accordance with various embodiments described below.

Figure 6A:
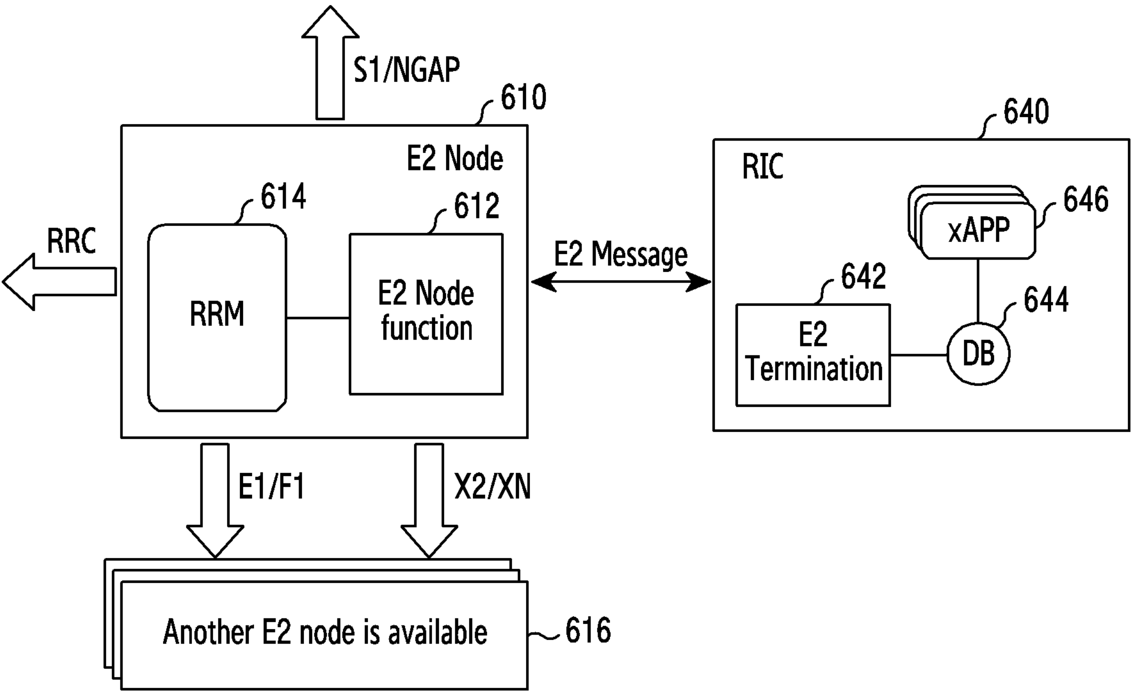
FIG. 6A illustrates a logical function relevant to an E2 message of an E2 node and RIC in a radio access network according to an embodiment of the disclosure.
Figure 6B:
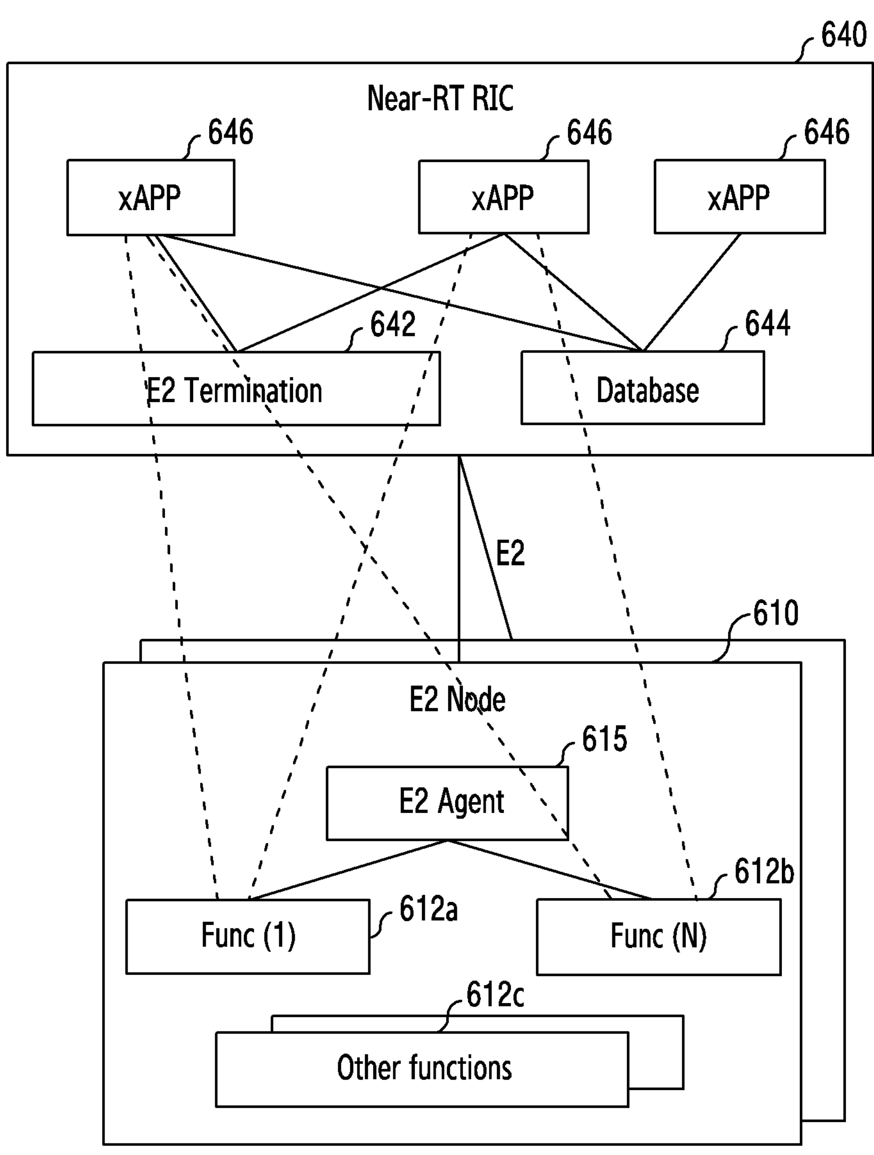
FIG. 6B illustrates a logical function relevant to an E2 message of an E2 node and RIC in a radio access network according to an embodiment of the disclosure.

FIGS. 6A and 6B illustrate a logical function relevant to an E2 message of an E2 node and RIC in a radio access network according to various embodiments of the disclosure.

Referring to FIG. 6A, an RIC 640 and an E2 node 610 may mutually transmit or receive an E2 message. For example, the E2 node 610 may be an O-CU-CP, an O-CU-UP, an O-DU, or a base station. A communication interface of the E2 node may be determined according to a type of the E2 node 610. For example, the E2 node 610 may perform communication with another E2 node 616 through an E1 interface or an F1 interface. Alternatively, for example, the E2 node 610 may perform communication with the E2 node 616 through an X2 interface or an XN interface. Alternatively, for example, the E2 node 610 may perform communication through an S1 interface or a Next Generation Application Protocol (NGAP) interface (i.e., an interface between a Next Generation (NG) RAN node and an access and mobility function (AMF)).

The E2 node 610 may include an E2 node function 612. The E2 node function 612 is a function corresponding to a specific application S/W (xApp) 646 installed in the RIC 640. For example, in case of a KPI monitor, a KPI monitor collection S/W is installed in the RIC 640, and the E2 node 610 may include the E2 node function 612 which generates KPI parameters and then transfers an E2 message including the KPI parameter to an E2 termination 642 located in the RIC 640. The E2 node 610 may include a Radio Resource Management (RRM) 614. The E2 node 610 may manage a resource provided to a radio network for a terminal.

The E2 termination 642 located in the RIC 640 is a termination of the RIC 640 for the E2 message, and performs a function which interprets the E2 message transferred by the E2 node 610 and then transfers it to the xApp 646. A Database (DB) 644 located in the RIC 640 may be used for the E2 termination 624 or the xApp 646. The E2 node 610 of FIG. 6A is a termination of at least one interface, and may be understood as a termination of messages to be transferred to the terminal, a neighboring base station, and a core network.

Referring to FIG. 6B, the xAPP of the RIC 640 may correspond to one or more E2 node functions of the E2 node 610. The E2 node function of the E2 node 610 may correspond to one or more xAPPs of the RIC 640. The E2 node functions Func (1) 612*a* to Func (N) 612*b* of the E2 node 610 may be managed by an E2 agent 615. The RIC 640 coupled to the E2 node 610 through the E2 interface denotes a near-RT RIC. The near-RT RIC may control and optimize a function and resource of the E2 node (O-CU-CP, O-CU-UP, O-DU, and O-eNB) on a real-time basis, i.e., near-RT, by performing data collection and control operations in units of about 10 milliseconds (ms) to 1 second through the E2 interface. The RIC 640 may use the E2 interface to host one or more xApps which collect (UE-based or cell-based) near-RT information and provide a service. The near-RT RIC control for the E2 node may be adjusted based on policy and enrichment data provided through A1 in the non-RT RIC. The RRM function 614 between the near-RT RIC 640 and the E2 node 610 is provided by the interaction of the function of the E2 node exposed to the E2 interface through the E2SM (Service Model).

Figure 7:
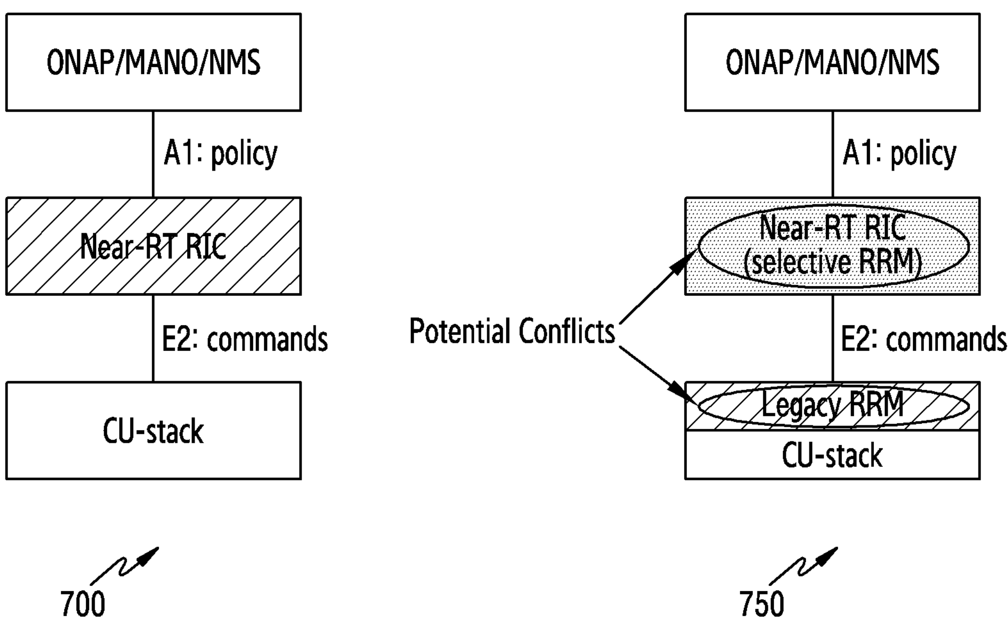
FIG. 7 illustrates examples of a function split between an E2 node and an RIC according to an embodiment of the disclosure.

FIG. 7 illustrates examples of a function split between an E2 node and an RIC according to an embodiment of the disclosure.

An O-RAN standard provides a function split between the E2 node and the RIC. For example, the E2 node may be a CU. The RIC may be a near-RT RIC. The RIC may be coupled to an Open Network Automation Platform (ONAP)/Management and Orchestration (MANO)/Network Management System (NMS) through an A1 interface. The RIC may be coupled to the E2 node through an E2 interface. The E2 interface may transfer commands. A function split option may have a function split 700 in which the entirety of Radio Resource Management (RRM) is managed by a near-RT RIC and a function split 740 in which the RRM is selectively managed in the near-RT RIC.

The near-RT RIC is expected to support E2 as an open logical interface aiming at multi-vendor environments regardless of the implementation of a specific RRC-RRM algorithm located in the near-RT RIC. The disclosure may propose an E2 Service Model Radio Interface Control (E2SM-RIC) paired with an E2SM-NI capable of inserting/modifying/configuring a per UE RRC message for each interface (I/F) and Network Entity (NE). In other words, the near-RT RIC may be improved gradually in the direction from the function split 750 to the function split 700. The E2 may be developed as an open logical interface independent of the implementation of the specific RRC-RRM algorithm in the near-RT RIC and aiming at the multi-vendor environments.

Figure 8A:
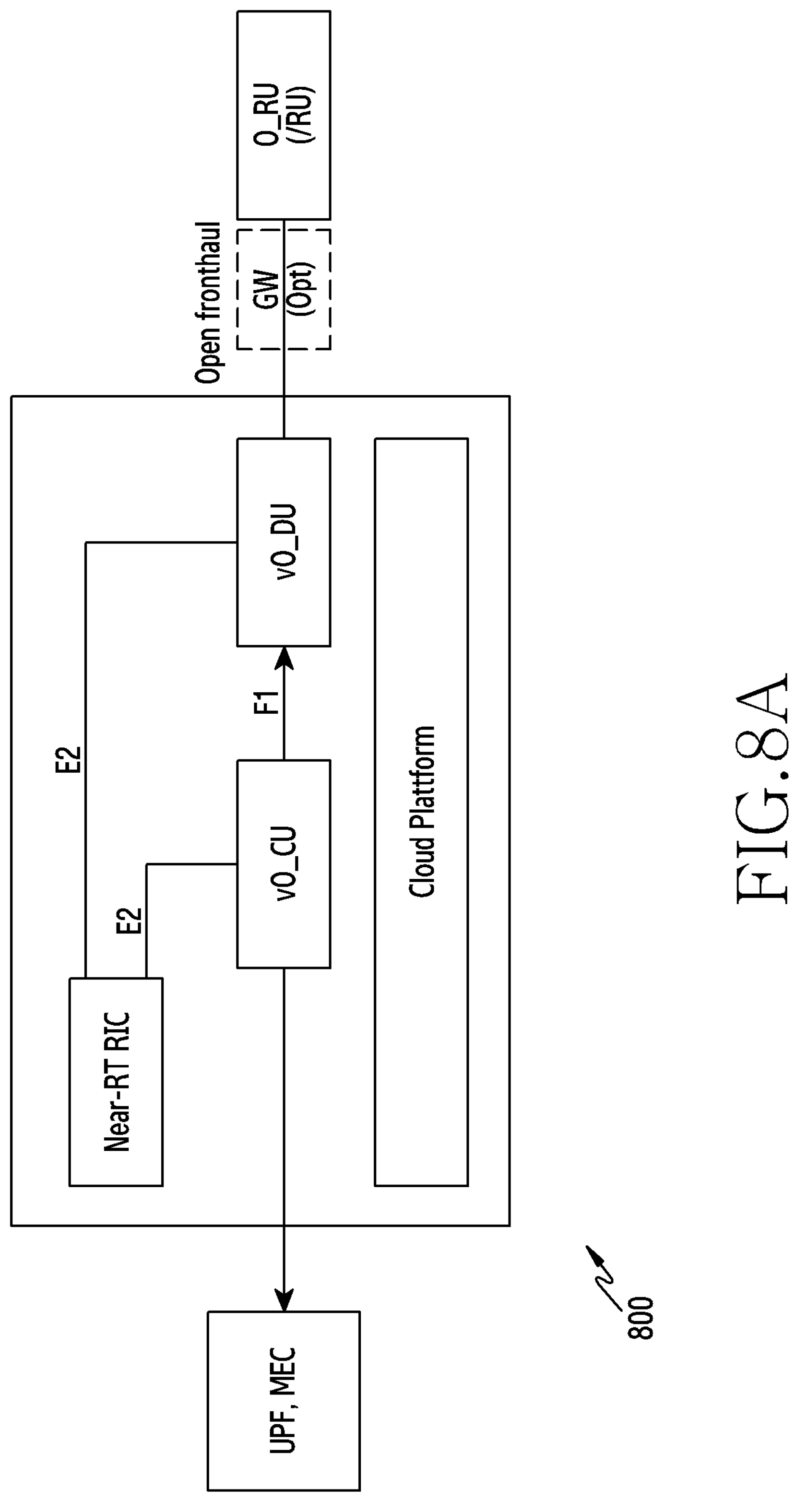
FIG. 8A illustrates an example of implementing an E2 node and an RIC according to an embodiment of the disclosure.

FIG. 8A illustrates an example of implementing an E2 node and an RIC according to an embodiment of the disclosure.

In a scenario of an implementation example 800, the E2 node (e.g., O-DU, O-CU) and the RIC may be virtualized in a cloud platform (e.g., an open chassis and a blade specification edge cloud) and configured in a device (e.g., a server). This scenario may support deployment in densely populated urban areas with abundant fronthaul capacity allowing a BBU function which is pooled in a central location, with low enough latency to meet an O-DU waiting time requirement. Therefore, it may not be necessary to attempt to centralize an RIC close to an RT beyond a limit capable of centralizing an O-DU function. According to an embodiment, the E2SM-RIC may be optimized for O-RAN deployment scenarios in which the near-RT RIC, the O-CU, and the O-DU are implemented in the O-cloud platform.

Figure 8B:
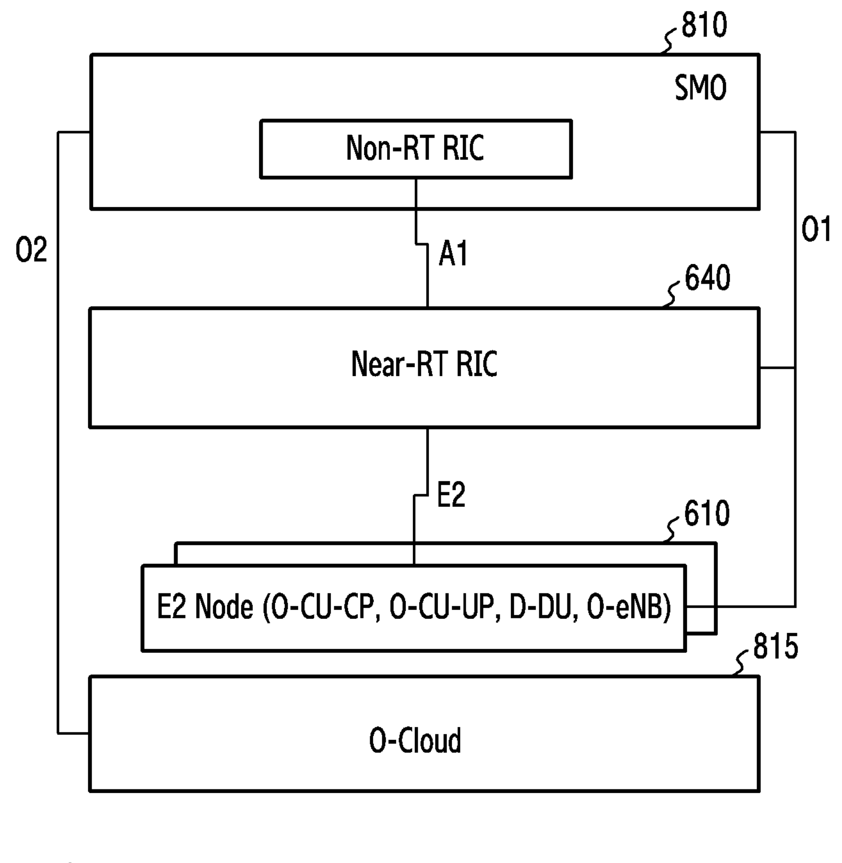
FIG. 8B illustrates an interface between O-RAN components according to an embodiment of the disclosure.

FIG. 8B illustrates an interface between O-RAN components according to an embodiment of the disclosure.

A logical architecture of the O-RAN is illustrated in FIG. 8. A Service Management and Orchestration (SMO) framework may be coupled to an O-RAN Network Function (NF) and an O-cloud through main interfaces used in the O-RAN, i.e., through an A1 interface, an O1 interface, an O2 interface, or the like. According to an embodiment, the O-RAN NF may be a Virtualized Network Function (VNF) on the O-cloud. In addition, according to an embodiment, the O-RAN NF may be in the form of a Containerized Network Function (CNF). In addition, according to an embodiment, the O-RAN NF may be a Physical Network Function (PNF) utilizing customized hardware.

The SMO is responsible for RAN domain management and orchestration functions. A main function of the SMO providing RAN support in the O-RAN includes a Fault, Configuration, Alarms, Performance and Security (FCAPS) interface for the O-RAN NF, a non-Real Time (RT) RAN Intelligent Controller (RIC) framework for RAN optimization, and an O-cloud management, orchestration, and workflow management function.

The non-RT RIC is an SMO internal function of the O-RAN architecture which provides the A1 interface to a near-Real Time (RT) RAN Intelligent Controller (RIC). The non-RT RIC is mainly aiming at supporting intelligent RAN optimization by providing the near-RT RIC with policy-based guidance, ML model management, and enrichment information to optimize RRM under a specific condition. The non-RT RIC may perform RAN optimization with an interval of non-real-time (at least 1 second) by using data analysis, Artificial Intelligence (AI)/Machine Learning (ML) training and inference.

Figure 8C:
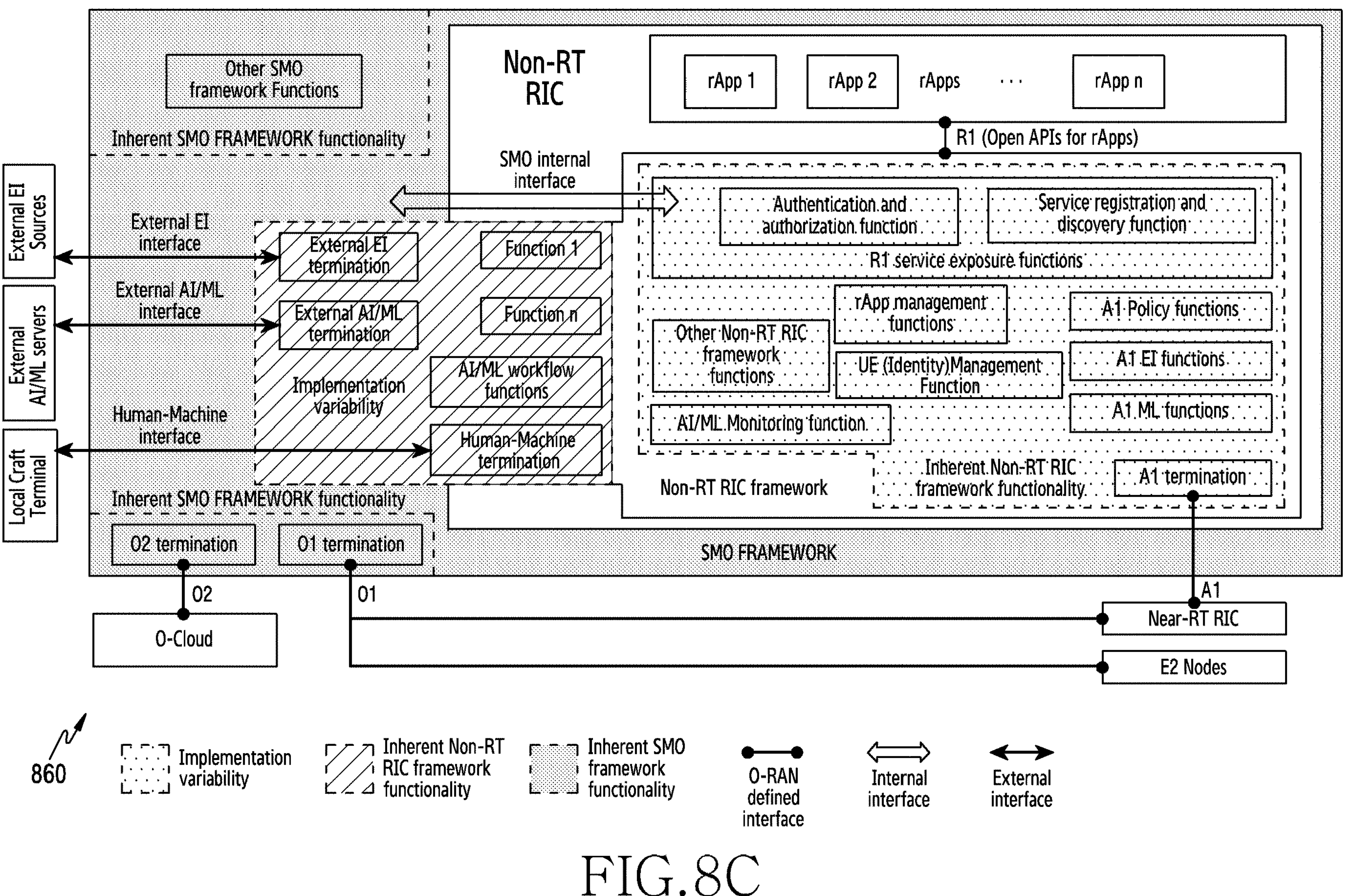
FIG. 8C illustrates an example of a Service Management and Orchestration (SMO) framework according to an embodiment of the disclosure.

FIG. 8C illustrates an example of an SMO framework according to an embodiment of the disclosure.

Referring to FIG. 8C and diagram 860, a non-RT RIC may include a UE Identity Management Function (IMF). Although it is referred to as the UE IMF in the disclosure, other terms referring to a corresponding functional structure may be used instead. For example, it may be understood that the non-RT RIC performs functions (or operations) of the UE IMF to be described below, such as a UE identifier manager, a UE identifier controller, a UE manager, a UE controller, a UE identity controller, a UE identity verifier, or the like.

According to embodiments of the disclosure, the non-RT RIC may perform communication with an SMO through an SMO internal interface. According to embodiments of the disclosure, the non-RT RIC may perform communication with an external source through an external interface. According to an embodiment, the non-RT RIC may perform communication with an external EI source through an external Enrichment Information (EI) interface. According to an embodiment, the non-RT RIC may perform communication with the external EI source through an external Artificial Intelligence (AI)/Machine Learning (ML) interface. According to an embodiment, the non-RT RIC may perform communication with a local craft terminal through an external Human Machine (HM) interface.

An O-RAN provides an RAN with openness, agility, and scalability. For the evolution of the RAN, the O-RAN allows to support an open and interoperable interface, RAN virtualization, big data, AI-assisted RAN intelligence, or the like. In addition, the use of commercial hardware and commercial silicon is maximized, and the use of dedicated hardware is avoided. An embedded or backend AI/ML system provides network intelligence through Near-Realtime (NRT) and non-Realtime (non-NRT) analytics. The O-RAN allows to configure a virtualized intelligent network with a standardized open interface.

In the O-RAN, the interface between the near-RT RIC and the E2 node is defined as an E2 interface. In the E2 interface, an E2AP protocol may be used in a radio network layer. The E2AP procedure consists of an E2AP near-RT RIC functional procedure and an E2AP global procedure. The E2AP near-RT RIC functional procedure may be used to transfer an application specific message between xApp (near-RT RIC applications) and a target function of the E2 node. The E2AP global procedure may be used for E2 interface management and service update or the like.

An elementary procedure for E2AP may be divided into a class-1 elementary procedure and a class-2 elementary procedure to be described below. Table 1 shows the class-1 elementary procedure, and Table 2 shows the class-2 elementary procedure.

TABLE 1

| Initiated by | Elementary Procedure | Initiating Message | Successful Outcome Response message | Unsuccessful Outcome Response message |
|---|---|---|---|---|
| Near-RT RIC | RIC Subscription | RIC SUBSCRIPTION REQUEST | RIC SUBSCRIPTION RESPONSE | RIC SUBSCRIPTION FAILURE |
| Near-RT RIC | RIC Subscription Delete | RIC SUBSCRIPTION DELETE REQUEST | RIC SUBSCRIPTION DELETE RESPONSE | RIC SUBSCRIPTION DELETE FAILURE |
| E2 Node | RIC Service Update | RIC SERVICE UPDATE | RIC SERVICE UPDATE ACKNOWLEDGE | RIC SERVICE UPDATE FAILURE |
| Near-RT RIC | RIC Control | RIC CONTROL REQUEST | RIC CONTROL ACKNOWLEDGE | RIC CONTROL FAILURE |
| E2 Node | E2 Setup | E2 SETUP REQUEST | E2 SETUP RESPONSE | E2 SETUP FAILURE |
| E2 Node | E2 Node Configuration Update | E2 NODE CONFIGURATION UPDATE | E2 NODE CONFIGURATION UPDATE ACKNOWLEDGE | E2 NODE CONFIGURATION UPDATE FAILURE |
| Near-RT RIC | E2 Connection Update | E2 CONNECTION UPDATE | E2 CONNECTION UPDATE ACKNOWLEDGE | E2 CONNECTION UPDATE FAILURE |
| Near-RT RIC or E2 Node | Reset | RESET REQUEST | RESET RESPONSE | |

TABLE 2

| Initiated by | Elementary Procedure | Initiating Message |
|---|---|---|
| E2 Node | RIC Indication | RIC INDICATION |
| Near-RT RIC | RIC Service Query | RIC SERVICE QUERY |
| E2 Node | RIC Subscription Delete Required | RIC SUBSCRIPTION DELETE REQUIRED |
| E2 Node or Near-RT RIC | Error Indication | ERROR INDICATION |

Figure 9:
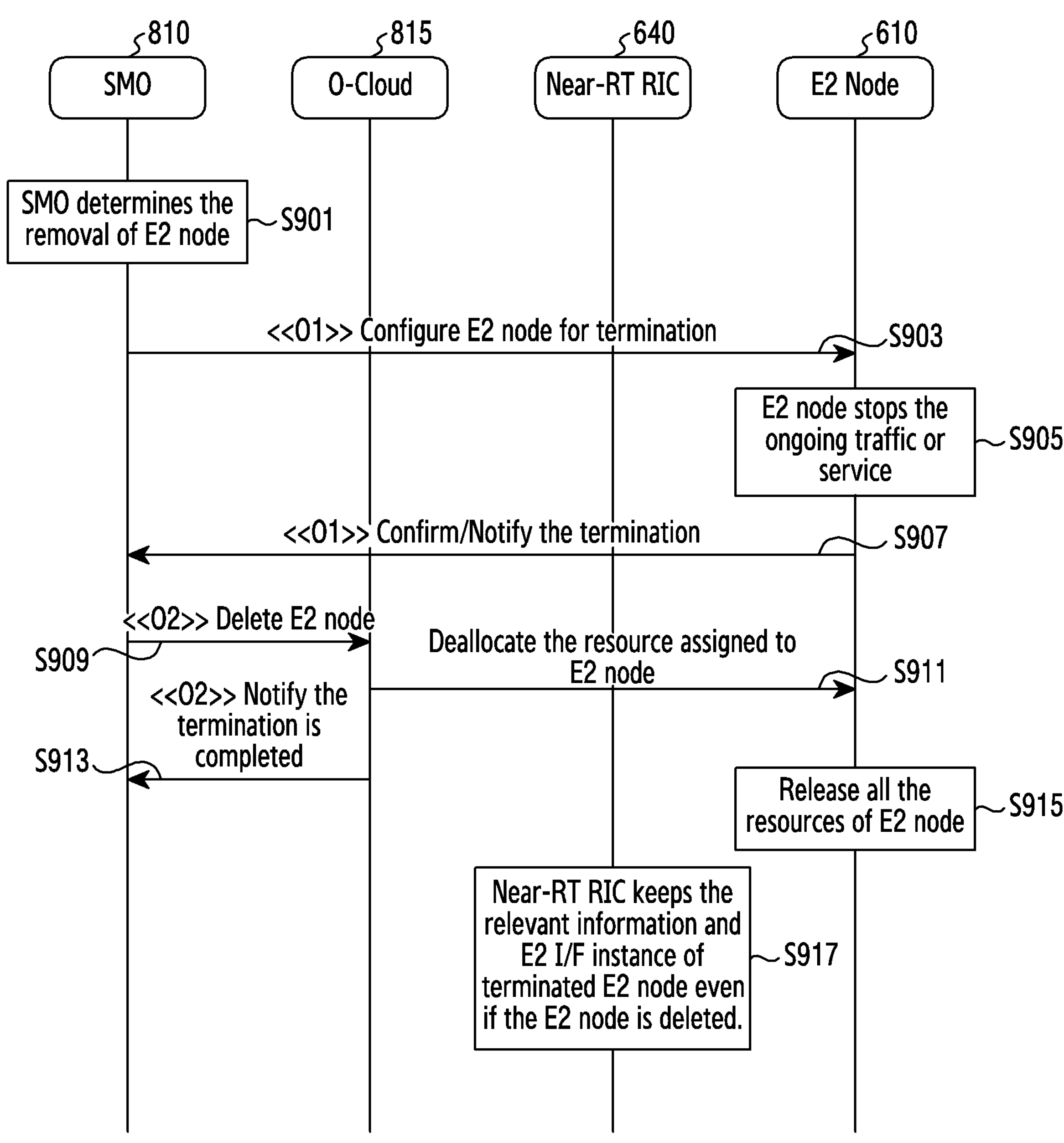
FIG. 9 is a diagram for explaining the necessity of removing E2 interface-relevant information according to an embodiment of the disclosure.

FIG. 9 is a diagram for explaining the necessity of removing E2 interface-relevant information according to an embodiment of the disclosure.

A termination process of an E2 node is described in FIG. 9. The FIG. 830 described below shows the termination process of the E2 node. The E2 termination process may be used to reduce the waste of resources, caused by the excessive deployment of the E2 node. Alternatively, the E2 termination process is a procedure required to remove an old version of the E2 node due to a build-and-replace S/W upgrade method. A SMO exemplifies the SMO 810 of FIG. 8B. An O-cloud exemplifies a controller for controlling the O-cloud 815 of FIG. 8B. A near-RT RIC exemplifies the near-RT RIC 640 of FIG. 6B. An E2 node exemplifies the E2 node 610 of FIGS. 6A and 6B.

Referring to FIG. 9, in operation S901, the SMO may determine the removal of the E2 node. The SMO may generate a configuration for removing the E2 node.

In operation S903, the SMO may transmit configuration information for the termination of the E2 node to the E2 node through an O1 interface. Upon determining the termination of a specific E2 node, the SMO may transfer the configuration information for the termination to the E2 node. The E2 node may receive the configuration information for the termination of the E2 node from the SMO through the O1 interface.

In operation S905, the E2 node may stop ongoing traffic (or service). That is, the E2 node may stop the traffic or service currently being served. The E2 node may stop the traffic or service, based on the configuration information received in the operation S903. For example, the E2 node may stop data traffic transmission. The E2 node may stop traffic transmission upon receiving the configuration information for the termination of the E2 node.

In operation S907, the E2 node may transmit a message for configuring (or reporting) the termination (hereinafter, a termination confirm message) to the SMO. The E2 node may transmit the termination confirm message to the SMO through the O1 interface. The SMO may receive the termination confirm message from the E2 node. Although it is described in FIG. 9 that the confirm message is received after the operation S905, the confirm message may be received immediately after the operation S903 in some embodiments.

In operation S909, the SMO may transmit the message for the termination of the E2 node to the O-cloud. The SMO may transmit the message for the termination of the E2 node to the O-cloud through an O2 interface. The message for the termination of the E2 node may mean a message for releasing a resource of the E2 node. When the SMO receives a service or traffic stop message from the E2 node, the SMO may transfer the message for releasing the resource of the E2 node to the O-cloud. The O-cloud may receive the message for releasing the resource of the E2 node from the SMO.

In operation S911, the O-cloud may transmit a resource deallocation message to the E2 node. According to an embodiment, the O-cloud may report resource deallocation to the E2 node through an application.

In operation S913, the O-cloud may transmit to the SMO a message for reporting that the termination of the E2 node is complete. The completion of the termination of the E2 node denotes that all resources assigned to the E2 node are released. That is, the O-cloud may release all resources of the E2 node and transfer a complete message to the SMO.

In operation S915, the E2 node may release all resources. The E2 node may release all resources, based on resource deallocation of the O-cloud. Since the E2 node may identify the termination of the E2 node through the SMO and the O-cloud, the E2 node may perform a procedure (e.g., deleting of an E2 interface-relevant configuration) depending on the termination of the E2 node.

In operation S917, the near-RT RIC may keep relevant information and E2 interface instance. The near-RT RIC is not able to know whether the E2 node is terminated. Therefore, even if the E2 node is terminated, the near-RT RIC continuously keeps the deleted E2 node-relevant information (e.g., global E2 node identifier (ID), RAN function info, E2 node component configuration, and so on) and E2 interface (e.g., SCTP connection). Although not shown in FIG. 9, in the opposite case (e.g., when the near-RT RIC is removed), the E2 node continuously keeps the near-RT RIC-relevant information and the E2 interface.

When E2 interface-relevant configuration (e.g., E2 node-relevant information, near-RT RIC-relevant information, or E2 interface configuration) is continuously kept, not only unnecessary resources are wasted but also incorrection information is continuously collected, which may cause an obstacle to a function of each node. For example, topology information may provide an incorrect result since data for a terminated E2 node is reflected. In addition, for example, when the terminated E2 node accesses again at a later time, an error may occur since a configuration of the E2 node is duplicated.

In order to solve the aforementioned problem, embodiments of the disclosure propose a method for deleting (or releasing) relevant information stored in each of the near-RT RIC and the E2 node, an E2 interface, or the like, when the connection of the E2 interface between the near-RT RIC and the E2 node is released in an Open RAN (O-RAN)-based mobile communication system. According to an embodiment, the disclosure proposes a method in which a near-RT RIC is capable of normally deleting relevant information of the E2 node, an E2 interface instance (e.g., SCTP), or the like when the E2 node is terminated. In addition, according to an embodiment, similarly to the opposite case, the disclosure proposes a method in which an E2 node is capable of normally deleting relevant information of a near-RT RIC, an E2 interface instance (e.g., SCTP), or the like when the near-RT RIC is terminated.

Hereinafter, information to be removed may be referred to as E2 interface-relevant information. According to an embodiment, the E2 interface-relevant information may include a relevant configuration of the E2 node. According to an embodiment, the E2 interface-relevant information may include a relevant configuration of the near-RT RIC. According to an embodiment, the E2 interface-relevant information may include a relevant configuration (e.g., SCTP) of the E2 interface.

As a first method of the disclosure, an explicit E2AP message exchange procedure (e.g., E2 removal request message and E2 removal response message) may be defined between the E2 node and the near-RT RIC. According to the E2 AP message exchange procedure, the E2 interface-relevant information may be removed. Specific operations according to the first method are described below with reference to FIG. 10A.

As a second method for the disclosure, a release timer may be defined, after an SCTP connection between the E2 node and the near-RT RIC is released. When the release timer expires, the relevant information of the E2 interface may be removed. Specific operations according to the second method are described below with reference to FIG. 10B.

As a third method of the disclosure, a procedure for an inquiry to the SMO may be defined, after the SCTP connection between the E2 node and the near-RT RIC is released. The procedure for the inquiry to the SMO may include inquiry transmission and response reception by the E2 node or the near-RT RIC. The E2 interface-relevant information may be removed in response to a response based on the procedure for the inquiry to the SMO. Specific operations according to the third method are described below with reference to FIG. 10C.

As a fourth method of the disclosure, an explicit configuration based on the SMO may be defined. E2 interface-relevant information may be removed, based on configuration information transmission through an O1 interface of the SMO. Specific operations according to the fourth method are described below with reference to FIG. 10D.

Figure 10A:
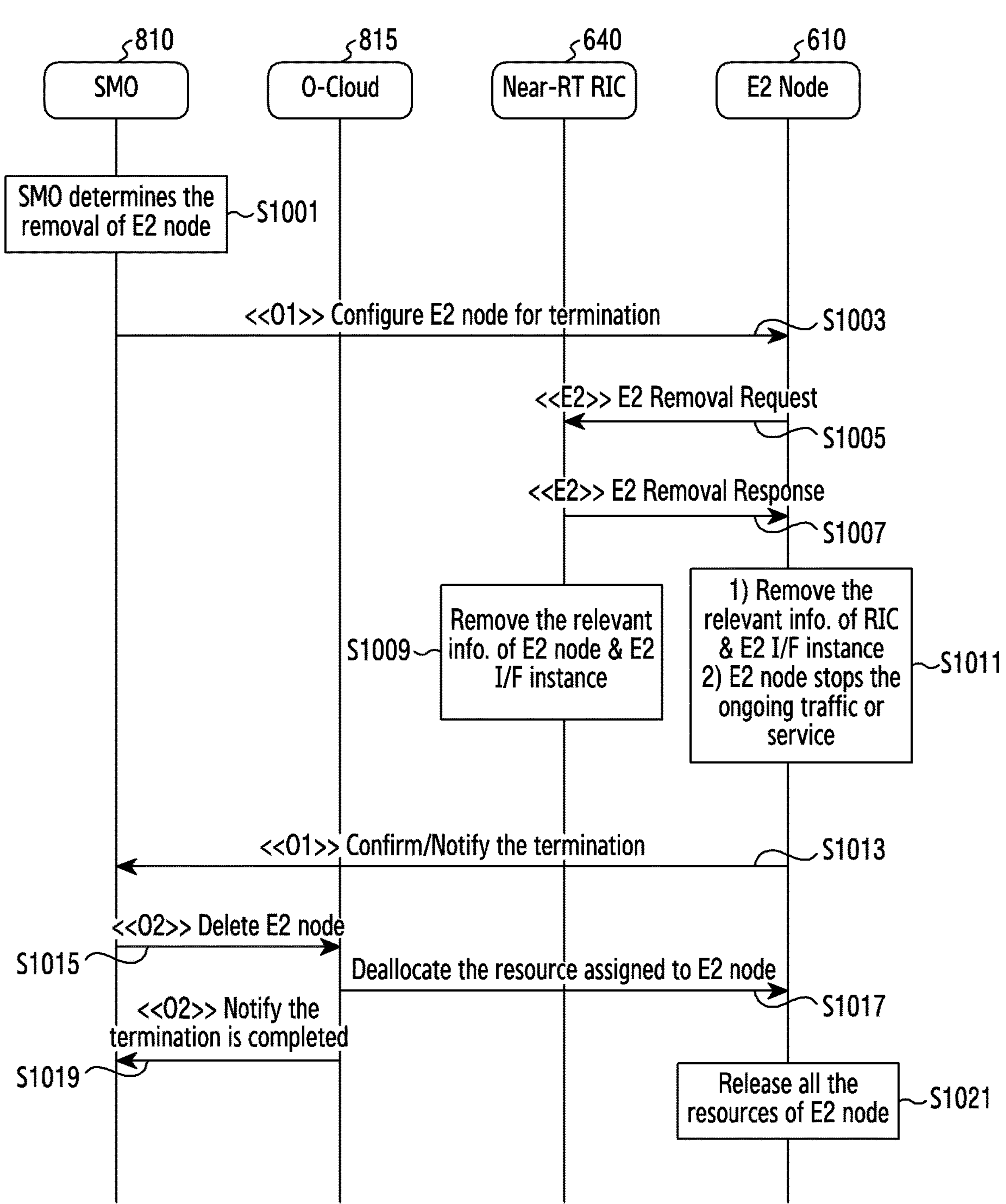
FIG. 10A illustrates an example of signaling between O-RAN entities for removing an E2 node according to an embodiment of the disclosure.

FIG. 10A illustrates an example of signaling between O-RAN entities for removing an E2 node according to an embodiment of the disclosure.

A method of removing relevant information based on an explicit E2AP message exchange scheme (E2 removal request/response) between the E2 node and a near-RT RIC is illustrated in FIG. 10A.

Referring to FIG. 10A, in operation S1001, an SMO may determine the removal of an E2 node. The SMO may generate a configuration for removing the E2 node.

In operation S1003, the SMO may transmit configuration information for the termination of the E2 node to the E2 node through an O1 interface. Upon determining the termination of a specific E2 node, the SMO may transfer the configuration information for the termination to the E2 node. The E2 node may receive the configuration information for the termination of the E2 node from the SMO through the O1 interface.

In operation S1005, the E2 node may transmit an E2 removal request message to the near-RT RIC. The E2 node may transmit the E2 removal request to the near-RT RIC through an E2 interface. According to an embodiment, an E2AP message for the E2 node removal request may be defined on the E2 interface (e.g., defined additionally in Table 1 or Table 2). When the E2 node receives the configuration information for the termination from the SMO, the E2 node may transmit an explicit E2 removal request message to the near-RT RIC through the E2 interface. The near-RT RIC may receive the E2 removal request message from the E2 node.

According to an embodiment, the E2 removal request message may include an E2 node Identifier (ID). The E2 node may report the near-RT RIC of the E2 node ID, which is to be terminated. In addition, according to an embodiment, the E2 removal request message may include a configuration relevant to the termination of the E2 node. The E2 node may additionally generate the E2 removal request message, based on configuration information received in the operation S1003. According to an embodiment, the E2 removal response message may include an RIC node ID. In addition, according to an embodiment, the E2 removal response message may indicate a configuration of a removal result.

In operation S1007, the near-RT RIC may transmit an E2 removal response message to the E2 node. According to an embodiment, an E2AP message for the E2 node removal request may be defined on the E2 interface. The E2 node may receive the E2 removal response message from the near-RT RIC. After the near-RT RIC which has received the E2 removal request message responds with the E2 removal response message, the E2 node may delete information relevant to the E2 node. In addition, the near-RT RIC may remove an E2 interface instance (e.g., SCTP connection) to the E2 node in operation S1009. The E2 node may receive the E2 removal request message from the near-RT RIC.

In operation S1011, the E2 node may delete E2 interface-relevant information. The E2 interface-relevant information may include a configuration relevant to a near-RT coupled through the E2 interface and an E2 interface instance configuration. The E2 node may delete the E2 interface instance after receiving the E2 removal response message. In addition, the E2 node may stop ongoing traffic (or service). That is, the E2 node may stop the traffic or service currently being served. For example, the E2 node may stop data traffic transmission. The E2 node may stop traffic transmission upon receiving the configuration information for the termination of the E2 node.

Thereafter, in operation S1013, the E2 node may transmit a message for configuring (or reporting) the termination (hereinafter, a termination confirm message) to the SMO. The E2 node may transmit the termination confirm message to the SMO through the O1 interface. The SMO may receive the termination confirm message from the E2 node.

In operation S1015, the SMO may transmit the message for the termination of the E2 node to the O-cloud. The SMO may transmit the message for the termination of the E2 node to the O-cloud through an O2 interface. The message for the termination of the E2 node may mean a message for releasing a resource of the E2 node. When the SMO receives a service or traffic stop message from the E2 node, the SMO may transfer the message for releasing the resource of the E2 node to the O-cloud. The O-cloud may receive the message for releasing the resource of the E2 node from the SMO.

In operation S1017, the O-cloud may transmit a resource deallocation message to the E2 node. According to an embodiment, the O-cloud may report resource deallocation to the E2 node through an application.

In operation S1019, the O-cloud may transmit to the SMO a message for reporting that the termination of the E2 node is complete. The completion of the termination of the E2 node denotes that all resources assigned to the E2 node are released. That is, the O-cloud may release all resources of the E2 node and transfer a complete message to the SMO.

In operation S1021, the E2 node may release all resources. The E2 node may release all resources, based on resource deallocation of the O-cloud. Since the E2 node may identify the termination of the E2 node through the SMO and the O-cloud, the E2 node may perform a procedure (e.g., deleting of an E2 interface-relevant configuration) depending on the termination of the E2 node.

Unlike in FIG. 9, since the near-RT RIC is aware of the termination of the E2 node, the near-RT RIC may no longer keep the E2 node-relevant information (e.g., global E2 node ID, RAN function info, E2 node component configuration, etc.) even if the E2 node is terminated. In addition, the near-RT RIC does not keep the E2 interface configuration (e.g., SCTP connection), which results in less unnecessary resource waste.

Although FIG. 10A describes the method in which the near-RT RIC deletes the E2 node-relevant configuration and the E2 interface configuration upon determining the termination of the E2 node, an embodiment of the disclosure may also be applied in the opposite case. That is, since the termination of the near-RT RIC is determined, the operation of deleting the near-RT RIC-relevant configuration and the E2 interface configuration in the E2 node may also be understood as an embodiment of the disclosure. According to an embodiment, when the near-RT RIC is terminated, the near-RT RIC may transmit an RIC removal request to the E2 node. The E2 node may transmit an RIC removal response to the near-RT RIC in response to the RIC removal request. Since the near-RT RIC and the E2 node share each other's termination configuration, the E2 interface-relevant configuration may be removed in each node.

Although two operations, i.e., a request and a response, are described in FIG. 10A, a last operation may be omitted in some embodiments. According to an embodiment, the E2 node may instruct the near-RT RIC to terminate the E2 node. The near-RT RIC may delete the E2 node-relevant configuration according to an instruction message of the E2 node, without an additional response process.

Although it is illustrated in FIG. 10A that confirm message transmission based on the operation S1013 is performed after the operation S1011, embodiments of the disclosure are not necessarily limited thereto. According to an embodiment, the confirm message transmission based on the operation S1013 may be performed before the operation S1011 is performed after the operation S1007. Alternatively, according to an embodiment, the confirm message transmission based on the operation S1013 may be performed after the operation S1003.

Figure 10B:
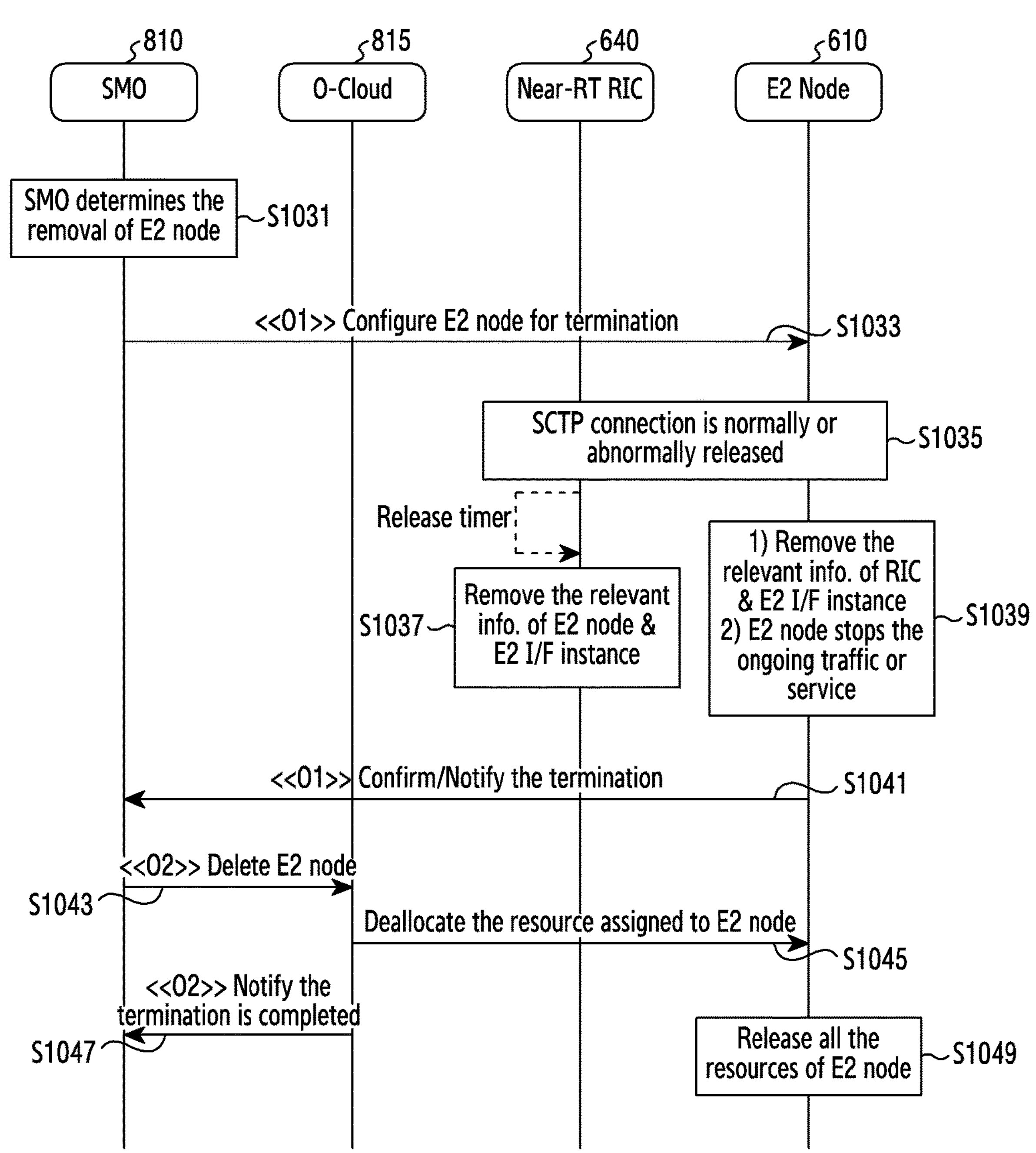
FIG. 10B illustrates another example of signaling between O-RAN entities for removing an E2 node according to an embodiment of the disclosure.

FIG. 10B illustrates another example of signaling between O-RAN entities for removing an E2 node according to an embodiment of the disclosure.

A method of removing relevant information at the expiry of a release timer after an SCTP connection is released between an E2 node and a near-RT RIC is illustrated in FIG. 10B.

Referring to FIG. 10B, in operation S1031, an SMO may determine the removal of the E2 node. The SMO may generate a configuration for removing the E2 node.

In operation S1033, the SMO may transmit configuration information for the termination of the E2 node to the E2 node through an O1 interface. Upon determining the termination of a specific E2 node, the SMO may transfer the configuration information for the termination to the E2 node. The E2 node may receive the configuration information for the termination of the E2 node from the SMO through the O1 interface.

In operation S1035, the SCTP connection may be released. The SCTP connection denotes a transport layer located below the E2AP layer which is a wireless network layer in the E2 interface. According to an embodiment, when the E2 node receives configuration information for the termination of the E2 node from the SMO, the E2 node may perform a procedure (3 way handshake (SHUTDOWN/SHUTDOWN-ACK/SHUTDOWN)-COMPLETE)) of normally releasing the SCTP connection with the near-RT RIC. Alternatively, the SCTP connection may be abnormally terminated.

In operation S1037, the near-RT RIC may delete E2 interface-relevant information. When the SCTP connection is normally released or when an abnormal termination is detected, the near-RT RIC triggers a release timer. When the release timer expires, that is, after the release timer ends, the near-RT RIC may delete relevant information for the E2 node or E2 interface instance information. According to an embodiment, the release timer may be pre-defined in a standard. In addition, according to an embodiment, the release timer may be set through an O1 interface or an A1 interface.

In operation S1039, the E2 node may delete E2 interface-relevant information. The E2 interface-relevant information may include a configuration relevant to a near-RT coupled through the E2 interface and an E2 interface instance configuration. In addition, the E2 node may stop ongoing traffic (or service). That is, the E2 node may stop the traffic or service currently being served.

Thereafter, in operation S1041, the E2 node may transmit a message for configuring (or reporting) the termination (hereinafter, a termination confirm message) to the SMO. The E2 node may transmit the termination confirm message to the SMO through the O1 interface. The SMO may receive the termination confirm message from the E2 node.

In operation S1043, the SMO may transmit the message for the termination of the E2 node to the O-cloud. The SMO may transmit the message for the termination of the E2 node to the O-cloud through an O2 interface. The message for the termination of the E2 node may mean a message for releasing a resource of the E2 node. When the SMO receives a service or traffic stop message from the E2 node, the SMO may transfer the message for releasing the resource of the E2 node to the O-cloud. The O-cloud may receive the message for releasing the resource of the E2 node from the SMO.

In operation S1045, the O-cloud may transmit a resource deallocation message to the E2 node. According to an embodiment, the O-cloud may report resource deallocation to the E2 node through an application.

In operation S1047, the O-cloud may transmit to the SMO a message for reporting that the termination of the E2 node is complete. The completion of the termination of the E2 node denotes that all resources assigned to the E2 node are released. That is, the O-cloud may release all resources of the E2 node and transfer a complete message to the SMO.

In operation S1049, the E2 node may release all resources. The E2 node may release all resources, based on resource deallocation of the O-cloud. Since the E2 node may identify the termination of the E2 node through the SMO and the O-cloud, the E2 node may perform a procedure (e.g., deleting of an E2 interface-relevant configuration) depending on the termination of the E2 node.

Unlike in FIG. 9, since the near-RT RIC operates a release timer, when the SCTP connection is released, the near-RT RIC may no longer keep the E2 node-relevant information (e.g., global E2 node ID, RAN function info, E2 node component configuration, etc.). In addition, the near-RT RIC does not keep the E2 interface configuration (e.g., SCTP connection). The release timer may result in correct collection of information on one or more E2 nodes relevant to the near-RT RIC and less unnecessary resource waste.

Although FIG. 10B describes the method in which the near-RT RIC deletes the E2 node-relevant configuration and the E2 interface configuration upon determining the termination of the E2 node, an embodiment of the disclosure may also be applied in the opposite case. That is, since the termination of the near-RT RIC is determined, the operation of deleting the near-RT RIC-relevant configuration and the E2 interface configuration in the E2 node may also be understood as an embodiment of the disclosure. According to an embodiment, the E2 node may start a release timer when the SCTP connection is released. When the release timer expires, the E2 node may remove the near-RT RIC-relative configuration and the E2 interface instance configuration.

Although it is illustrated in FIG. 10B that confirm message transmission based on the operation S1041 is performed after the operation S1039, embodiments of the disclosure are not necessarily limited thereto. According to an embodiment, the confirm message transmission based on the operation S1041 may be performed before the operation S1039 is performed after the operation S1037. Alternatively, according to an embodiment, the confirm message transmission based on the operation S1041 may be performed when a specific time elapses by a timer after the SCTP connection is released based on the operation S1033 or the operation S1035.

Figure 10C:
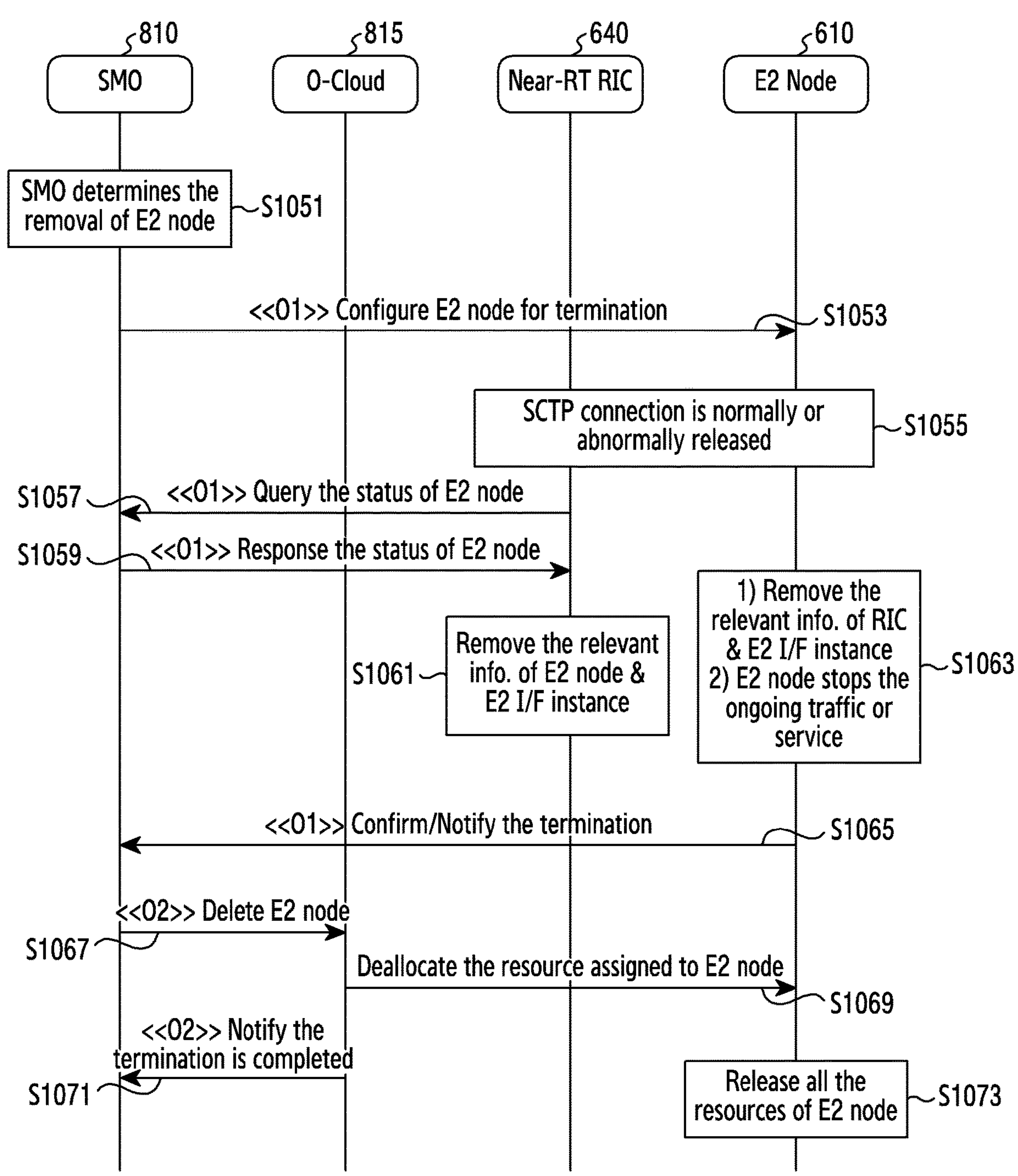
FIG. 10C illustrates another example of signaling between O-RAN entities for removing an E2 node according to an embodiment of the disclosure.

FIG. 10C illustrates another example of signaling between O-RAN entities for removing an E2 node according to an embodiment of the disclosure.

A method of deleting relevant information through a response after inquiring an SMO about a status of a peer node after the SCTP connection is released between the E2 node and the near-RT RIC is illustrated in FIG. 10C.

Referring to FIG. 10C, in operation S1051, an SMO may determine the removal of an E2 node. The SMO may generate a configuration for removing the E2 node.

In operation S1053, the SMO may transmit configuration information for the termination of the E2 node to the E2 node through an O1 interface. Upon determining the termination of a specific E2 node, the SMO may transfer the configuration information for the termination to the E2 node. The E2 node may receive the configuration information for the termination of the E2 node from the SMO through the O1 interface.

In operation S1055, the SCTP connection may be released. The SCTP connection denotes a transport layer located below the E2AP layer which is a wireless network layer in the E2 interface. According to an embodiment, when the E2 node receives configuration information for the termination of the E2 node from the SMO, the E2 node may perform a procedure (3 way handshake (SHUTDOWN/SHUTDOWN-ACK/SHUTDOWN)-COMPLETE)) of normally releasing the SCTP connection with the near-RT RIC. Alternatively, the SCTP connection may be abnormally terminated.

In operation S1057, the near-RT RIC may transmit to the SMO a message for inquiring a status of the E2 node. When the SCTP connection is normally released or when an abnormal termination is detected, the near-RT RIC transmits to the SMO a query for a status indicating whether the termination of the E2 node is ongoing. The query message may be transmitted in response to detecting of the release of the SCTP connection. The near-RT RIC may transmit the query message to the SMO through the O1 interface. The SMO may receive from the near-RT RIC a message for inquiring the status of the E2 node.

In operation S1059, the SMO may transmit to the near-RT RIC a response message including the status of the E2 node. The near-RT RIC may receive a response indicating that the termination of the E2 node is ongoing.

In operation S1061, the near-RT RIC may delete E2 interface-relevant information. After receiving the response message, the near-RT RIC may delete relevant information for the E2 node or E2 interface instance information.

In operation S1063, the E2 node may delete E2 interface-relevant information. The E2 interface-relevant information may include a configuration relevant to a near-RT coupled through the E2 interface and an E2 interface instance configuration. In addition, the E2 node may stop ongoing traffic (or service). That is, the E2 node may stop the traffic or service currently being served.

Thereafter, in operation S1065, the E2 node may transmit a message for configuring (or reporting) the termination (hereinafter, a termination confirm message) to the SMO. The E2 node may transmit the termination confirm message to the SMO through the O1 interface. The SMO may receive the termination confirm message from the E2 node.

In operation S1067, the SMO may transmit the message for the termination of the E2 node to the O-cloud. The SMO may transmit the message for the termination of the E2 node to the O-cloud through an O2 interface. The message for the termination of the E2 node may mean a message for releasing a resource of the E2 node. When the SMO receives a service or traffic stop message from the E2 node, the SMO may transfer the message for releasing the resource of the E2 node to the O-cloud. The O-cloud may receive the message for releasing the resource of the E2 node from the SMO.

In operation S1069, the O-cloud may transmit a resource deallocation message to the E2 node. According to an embodiment, the O-cloud may report resource deallocation to the E2 node through an application.

In operation S1071, the O-cloud may transmit to the SMO a message for reporting that the termination of the E2 node is complete. The completion of the termination of the E2 node denotes that all resources assigned to the E2 node are released. That is, the O-cloud may release all resources of the E2 node and transfer a complete message to the SMO.

In operation S1073, the E2 node may release all resources. The E2 node may release all resources, based on resource deallocation of the O-cloud. Since the E2 node may identify the termination of the E2 node through the SMO and the O-cloud, the E2 node may perform a procedure (e.g., deleting of an E2 interface-relevant configuration) depending on the termination of the E2 node.

Unlike in FIG. 9, since the near-RT RIC directly inquires the SMO, when the SCTP connection is released, the near-RT RIC may no longer keep the E2 node-relevant information (e.g., global E2 node ID, RAN function info, E2 node component configuration, etc.). In addition, the near-RT RIC does not keep the E2 interface configuration (e.g., SCTP connection). Through the procedure of inquiring the status of the E2 node termination through the O1 interface, information on one or more E2 nodes relevant to the near-RT RIC may be correctly collected, and unnecessary resource waste may be reduced.

Although FIG. 10C describes the method in which the near-RT RIC deletes the E2 node-relevant configuration and the E2 interface configuration upon determining the termination of the E2 node, an embodiment of the disclosure may also be applied in the opposite case. That is, since the termination of the near-RT RIC is determined, the operation of deleting the near-RT RIC-relevant configuration and the E2 interface configuration in the E2 node may also be understood as an embodiment of the disclosure. According to an embodiment, the E2 node may inquire the SMO about the status of the near-RT RIC through the O1 interface, when the SCTP connection is released. The E2 node may receive from the SMO a response message indicating that the termination of the near-RT RIC is ongoing. In response to the response message, the E2 node may remove the near-RT RIC-relative configuration and the E2 interface instance configuration.

Although it is illustrated in FIG. 10B that confirm message transmission based on the operation S1065 is performed after the operation S1063, embodiments of the disclosure are not necessarily limited thereto. According to an embodiment, the confirm message transmission based on the operation S1065 may be performed before the operation S1063 is performed after the operation S1061. Alternatively, according to an embodiment, the confirm message transmission based on the operation S1065 may be performed when a specific time elapses after the SCTP connection is released based on the operation S1053 or the operation S1055.

Figure 10D:
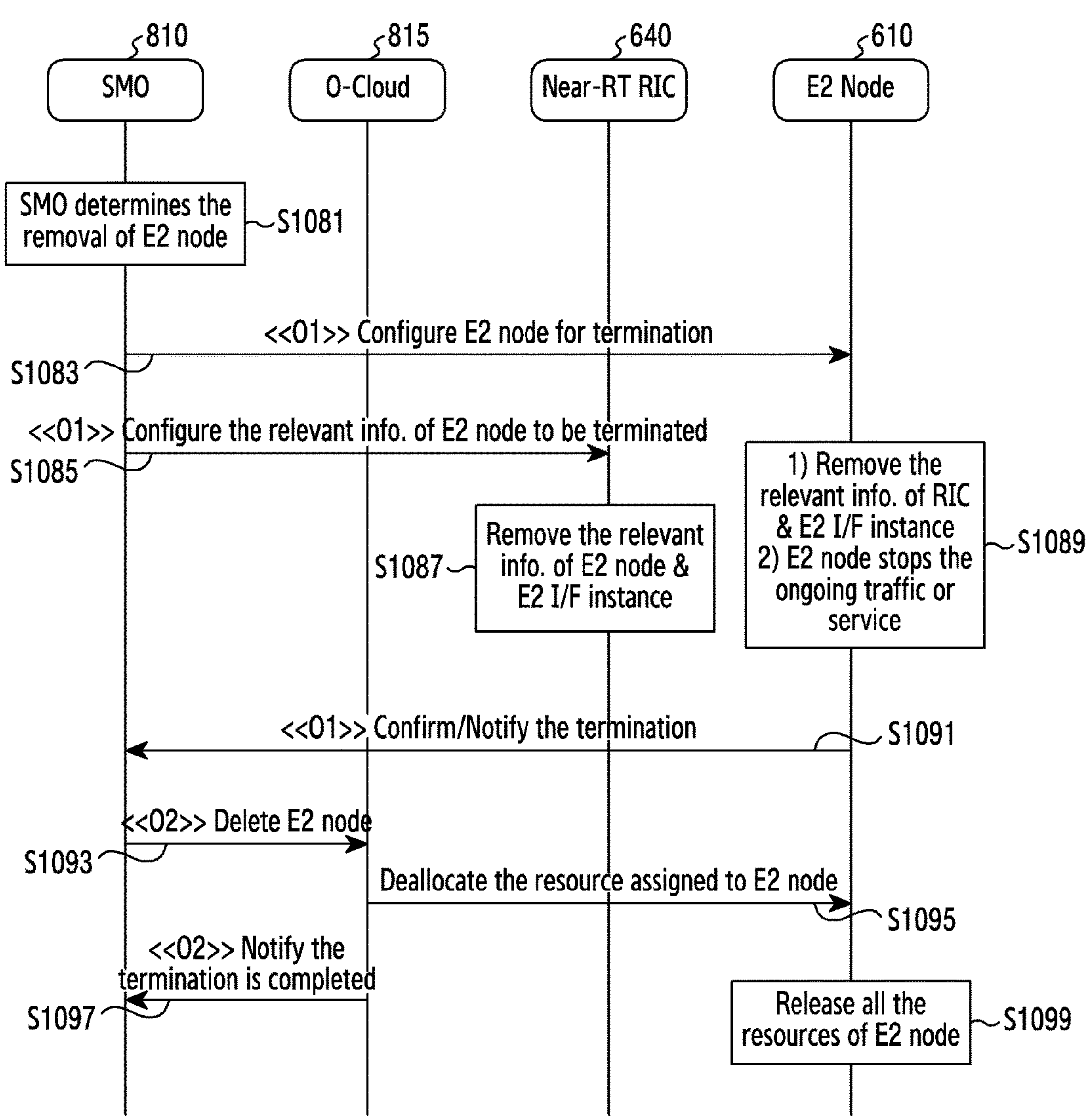
FIG. 10D illustrates another example of signaling between O-RAN entities for removing an E2 node according to an embodiment of the disclosure.

FIG. 10D illustrates another example of signaling between O-RAN entities for removing an E2 node according to an embodiment of the disclosure.

A method of deleting relevant information when an SMO transfers information explicitly to an E2 node and a near-RT RIC is illustrated in FIG. 10D.

In operation S1081, the SMO may determine the removal of the E2 node. The SMO may generate a configuration for removing the E2 node.

In operation S1083, the SMO may transmit configuration information for the termination of the E2 node to the E2 node through an O1 interface. Upon determining the termination of a specific E2 node, the SMO may transfer the configuration information for the termination to the E2 node. The E2 node may receive the configuration information for the termination of the E2 node from the SMO through the O1 interface.

In operation S1085, the SMO may transmit to the near-RT RIC a setup message regarding the termination of the E2 node through the O1 interface. According to an embodiment, the SMO may transmit to the near-RT RIC a setup message reporting that the E2 node is expected to be terminated. According to an embodiment, the SMO may transmit to the near-RT RIC a setup message including relevant configuration information regarding the E2 node to be terminated. According to an embodiment, the SMO may transmit to the near-RT RIC a setup message for indicating the E2 node to be terminated. The SMO may identify the near-RT RIC coupled to the E2 node to be subjected to termination. Since one or more E2 nodes may be coupled to the near-RT RIC, the transmitted setup message may include E2 node identification information (e.g., E2 node ID) for indicating the E2 node subjected to termination.

When the SMO transfers the configuration information to terminate the E2 node, the SMO may transfer a message to the near-RT RIC coupled to the E2 node to remove relevant information of the E2 node and E2 interface instance.

In operation S1087, the near-RT RIC may delete E2 interface-relevant information. The near-RT RIC which has received the message proceeds to an operation of deleting information relevant to the E2 node.

In operation S1089, the E2 node may delete E2 interface-relevant information. The E2 interface-relevant information may include a configuration relevant to a near-RT coupled through the E2 interface and an E2 interface instance configuration. In addition, the E2 node may stop ongoing traffic (or service). That is, the E2 node may stop the traffic or service currently being served.

In operation S1091, the E2 node may transmit a message for configuring (or reporting) the termination (hereinafter, a termination confirm message) to the SMO. The E2 node may transmit the termination confirm message to the SMO through the O1 interface. The SMO may receive the termination confirm message from the E2 node.

In operation S1092, the near-RT RIC may transmit to the SMO a notification message for confirming the termination of the E2 node. As a response message for the operation S1085 of the SMO, the near-RT RIC may transmit a confirm message. The near-RT RIC may transmit the termination confirm message, which is the notification message for confirming the termination of the E2 node, to the SMO through the O1 interface. The SMO may receive the termination confirm message from the near-RT RIC. Although not shown in FIG. 10D, the near-RT RIC may transmit a response message for the operation S1085. According to an embodiment, the near-RT RIC may transmit the response message for the operation S1085 directly to the E2 node, or according to another embodiment, the near-RT RIC may transmit the response message for the operation S1085 to the E2 node after the operation S1087.

In operation S1093, the SMO may transmit the message for the termination of the E2 node to the O-cloud. The SMO may transmit the message for the termination of the E2 node to the O-cloud through an O2 interface. The message for the termination of the E2 node may mean a message for releasing a resource of the E2 node. When the SMO receives a service or traffic stop message from the E2 node, the SMO may transfer the message for releasing the resource of the E2 node to the O-cloud. The O-cloud may receive the message for releasing the resource of the E2 node from the SMO.

In operation S1095, the O-cloud may transmit a resource deallocation message to the E2 node. According to an embodiment, the O-cloud may report resource deallocation to the E2 node through an application.

In operation S1097, the O-cloud may transmit to the SMO a message for reporting that the termination of the E2 node is complete. The completion of the termination of the E2 node denotes that all resources assigned to the E2 node are released. That is, the O-cloud may release all resources of the E2 node and transfer a complete message to the SMO.

In operation S1099, the E2 node may release all resources. The E2 node may release all resources, based on resource deallocation of the O-cloud. Since the E2 node may identify the termination of the E2 node through the SMO and the O-cloud, the E2 node may perform a procedure (e.g., deleting of an E2 interface-relevant configuration) depending on the termination of the E2 node.

Unlike in FIG. 9, since the SMO transmits the termination-relevant configuration not only to the E2 node but also to the near-RT RIC, when the SCTP connection is released, the near-RT RIC may no longer keep the E2 node-relevant information (e.g., global E2 node ID, RAN function info, E2 node component configuration, etc.). In addition, the near-RT RIC does not keep the E2 interface configuration (e.g., SCTP connection). Since the termination configuration of the E2 node through the O1 interface is transmitted to all of nodes of the E2 interface, information on ongoing E2 nodes may be correctly collected, and unnecessary resource waste may be reduced.

Although FIG. 10A describes the method in which the near-RT RIC deletes the E2 node-relevant configuration and the E2 interface configuration upon determining the termination of the E2 node, an embodiment of the disclosure may also be applied in the opposite case. That is, since the termination of the near-RT RIC is determined, the operation of deleting the near-RT RIC-relevant configuration and the E2 interface configuration in the E2 node may also be understood as an embodiment of the disclosure. According to an embodiment, upon determining the termination of the near-RT RIC, the SMO may only transmit a setup message regarding the termination to the near-RT RIC but also transmit the setup message regarding the termination of the near-RT RIC to one or more E2 nodes coupled to the near-RT RIC.

Although it is illustrated in FIG. 10D that confirm message transmission based on the operation S1091 is performed after the operation S1089, embodiments of the disclosure are not necessarily limited thereto. According to an embodiment, the confirm message transmission based on the operation S1091 may be performed before the operation S1089 is performed after the operation S1087. Alternatively, according to an embodiment, the confirm message transmission based on the operation S1091 may be performed after the operation S1083.

Embodiments of the disclosure propose a method for deleting information stored in a peer node when either the rear-RT RIC or the E2 node providing the E2 interface is terminated. Based on methods according to embodiments of the disclosure, when the E2 node is terminated, the near-RT RIC may delete to-be-terminated E2 node-relevant information (e.g., Global E2 Node ID, RAN Function info, E2 Node component configuration, RIC services REPORT/INSERT information received during the RIC Indication procedure, etc.) and E2 I/F instance information (i.e., transport layer information of the E2 node), stored in the near-RT RIC. In addition, based on the methods according to embodiments of the disclosure, when the near-RT RIC is terminated, to-be-terminated near-RT RIC-relevant information (e.g., global RIC ID, RIC subscription information (RIC services REPORT, INSERT and/or POLICY) received during the subscription procedure, RIC service control information received during the control procedure, etc.) and E2 I/F instance information (e.g., transport layer information of the near-RT RIC), stored in the E2 node, may be deleted.

Embodiments of the disclosure propose a method for deleting relevant information, E2 I/F, or the like stored in each of the near-RT RIC and the E2 node when the E2 interface connection between the near-RT RIC and the E2 node is released in an Open RAN (O-RAN)-based mobile communication system. The E2 interface-relevant configuration mentioned in FIGS. 10A to 10D described above may be defined as follows. When the E2 node is terminated, the near-RT RIC may remove the configuration for the E2 node. The termination of the E2 node denotes that the SCTP connection from the E2 node is terminated. When the near-RT RIC is terminated, the E2 node may remove the configuration for the near-RT RIC. That is, the E2 interface-relevant configuration mentioned in the disclosure may include a configuration for the E2 node or a configuration for the near-RT RIC.

The E2 node-relevant configuration denotes information obtained by performing an elementary procedure (e.g., Table 1, Table 2) with respect to the E2 node. According to an embodiment, the E2 interface-relevant configuration to be removed may include information obtained through an RIC subscription procedure. For example, the information to be removed may include an RIC request ID. In addition, for example, the information to be removed may include an RAN function ID. In addition, for example, the information to be removed may include an RIC event trigger definition.

According to an embodiment, the E2 interface-relevant information to be removed may include information obtained through an RIC indication procedure. For example, the information to be removed may include an RIC request ID. In addition, for example, the information to be removed may include an RAN function ID. In addition, for example, the information to be removed may include an RIC action ID. In addition, for example, the information to be removed may include an RIC call process ID. In addition, for example, the information to be removed may include an RIC indication message, type, header, and SN.

According to an embodiment, the E2 interface-relevant configuration to be removed may include information obtained through an RIC control procedure. For example, the information to be removed may include an RIC request ID. In addition, for example, the information to be removed may include an RAN function ID. In addition, for example, the information to be removed may include an RIC call process ID. In addition, for example, the information to be removed may include an RIC control message.

According to an embodiment, the E2 interface-relevant configuration to be removed may include information obtained through an E2 setup procedure. For example, the information to be removed may include an E2 node ID. In addition, for example, the information to be removed may include information (item, ID, definition) for an RAN function. In addition, for example, the information to be removed may include an E2 node component configuration.

According to an embodiment, the E2 interface-relevant information to be removed may include information obtained through an E2 configuration update procedure. For example, the information to be removed may include a global E2 node ID. In addition, for example, the information to be removed may include information (item, ID, definition) for an RAN function. In addition, for example, the information to be removed may include an E2 node component configuration. In addition, for example, the information to be removed may include E2 node Transport Network Layer (TNL)-relevant information (E2 Node TNL Association To Remove List).

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure. The one or more processors may include a radio frequency (RF) processor, and a base band processor. The RF processor may perform a function of transmitting or receiving a signal via a wireless channel, such as band conversion and amplification of a signal. The baseband processor may execute a function of converting between a baseband signal and a bit string according to the physical layer standard of a system, for example, in the case of data transmission, the baseband processor may produce complex symbols by encoding and modulating a transmission bit string. Additionally, The processor may execute various instructions of one or more programs that may be loaded into memory to perform various operations of the device and to process data. The processor may be a symmetric multi-processor system containing multiple processors of the same type. The processor may include a central processing unit (CPU), a microprocessor, an application specific integrated circuit (ASIC), a field programmable gate arrays (FPGAs), an application processor (AP), a digital signal processor (DSP), a communication processor (CP) together with an RF processor, and the base band processor. The processor may be a set of one or more processors or may be a multi-processor core, depending on the particular implementation. Here the set of one or more processors may include one or more microprocessor, an application specific integrated circuit (ASIC), a field programmable gate arrays (FPGAs), an application processor (AP), a digital signal processor (DSP), a communication processor (CP), one or more of an application processor (e.g. a central processing unit (CPU)), a communication processor (e.g., a modem), a graphical processing unit (GPU), a neural processing unit (NPU) (e.g., an artificial intelligence (AI) chip), a Wi-Fi chip, a Bluetooth chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, or the like. The device may perform operations based collectively on different processors of the one or more processors executing different instructions of the one or more programs. Further, the processor may be implemented using one or more heterogeneous processor systems in which a main processor is present with secondary processors on a single chip. As another illustrative example, the processor may be a symmetric multi-processor system containing multiple processors of the same type. Memory may include one or more computer-readable storage media. The computer-readable storage media are, for example, tangible and non-transitory.

The program (i.e., the software module or software) may be stored in random access memory, non-volatile memory including flash memory, Read Only Memory (ROM), Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Memory may include high-speed random access memory and also includes non-volatile memory, such as one or more magnetic disk storage devices, flash memory devices, or other non-volatile solid-state memory devices. In some examples, one of more non-transitory computer-readable storage media of memory is used to store instructions (e.g., for performing aspects of operations described herein) for use by or in connection with the processor, which can fetch and execute the instructions. The memory may be distributed among different types of memory, with any given type being singular or plural memory. Different memory may be used by, or associated with, a different at least one of the one or more processors. Alternatively, the program may be stored in memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a near-real time (RT) radio access network (RAN) intelligent controller (RIC) in a wireless communication system, the method comprising:

receiving, from an E2 node, an E2 removal request message for removing a signaling connection between the near-RT RIC and the E2 node through an E2 interface;

transmitting, to the E2 node, an E2 removal response message through the E2 interface; and releasing at least one resource associated with removing of the signaling connection between the near-RT RIC and the E2 node, wherein the E2 node comprises an open radio access network (O-RAN) distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

2. The method of claim 1, further comprising:

deleting information associated with the signaling connection between the near-RT RIC and the E2 node.

3. The method of claim 1, wherein at least one resource associated with the signaling connection between the near-RT RIC and the E2 node is removed in the E2 node after transmitting the E2 removal response message.

4. The method of claim 1, wherein a data transmission from the E2 node to the near-RT RIC is stopped after transmitting the E2 removal response message.

5. A near-real time (RT) radio access network (RAN) intelligent controller (RIC) in a wireless communication system, the near-RT RIC comprising:

a transceiver;

at least one processor; and memory storing instructions that, when executed by the at least one processor, cause the near-RT RIC to:

receive, from an E2 node, an E2 removal request message for removing a signaling connection between the near-RT RIC and the E2 node through an E2 interface, transmit, to the E2 node, an E2 removal response message through the E2 interface, and release at least one resource associated with removing of the signaling connection between the near-RT RIC and the E2 node, wherein the E2 node comprises an open radio access network (O-RAN) distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

6. The near-RT RIC of claim 5, wherein the memory further comprises the instructions that, when executed by the at least one processor, cause the near-RT RIC to:

delete information associated with the signaling connection between the near-RT RIC and the E2 node.

7. The near-RT RIC of claim 5, wherein at least one resource associated with the signaling connection between the near-RT RIC and the E2 node is removed in the E2 node after transmitting the E2 removal response message.

8. The near-RT RIC of claim 5, wherein a data transmission from the E2 node to the near-RT RIC is stopped after transmitting the E2 removal response message.

9. A method performed by an E2 node in a wireless communication system, the method comprising:

transmitting, to a near-Real Time (RT) radio access network (RAN) intelligent controller (RIC), an E2 removal request message for removing a signaling connection between the near-RT RIC and the E2 node through an E2 interface;

receiving, from the near-RT RIC, an E2 removal response message through the E2 interface; and releasing at least one resource associated with removing of the signaling connection between the near-RT RIC and the E2 node, wherein the E2 node comprises an open radio access network (O-RAN) distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

10. The method of claim 9, further comprising:

stopping a data transmission to the near-RT RIC.

11. The method of claim 9, wherein at least one resource associated with the signaling connection between the near-RT RIC and the E2 node is removed in the near-RT RIC after receiving the E2 removal response message.

12. The method of claim 1, wherein information associated with the signaling connection between the near-RT RIC and the E2 node is deleted in the near-RT RIC after receiving the E2 removal response message.

13. An E2 node in a wireless communication system, the E2 node comprising:

a transceiver;

at least one processor; and memory storing instructions that, when executed by the at least one processor, cause the E2 node to:

transmit, to a near-Real Time (RT) radio access network (RAN) intelligent controller (RIC), an E2 removal request message for removing a signaling connection between the near-RT RIC and the E2 node through an E2 interface, receive, from the near-RT RIC, an E2 removal response message through the E2 interface, and release at least one resource associated with removing of the signaling connection between the near-RT RIC and the E2 node, wherein the E2 node comprises an open radio access network (O-RAN) distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

14. The E2 node of claim 13, wherein the memory further comprises the instructions that, when executed by the at least one processor, cause the E2 node to:

stop a data transmission to the near-RT RIC.

15. The E2 node of claim 13, wherein at least one resource associated with the signaling connection between the near-RT RIC and the E2 node is removed in the near-RT RIC after receiving the E2 removal response message.

16. The E2 node of claim 13, wherein information associated with the signaling connection between the near-RT RIC and the E2 node is deleted in the near-RT RIC after receiving the E2 removal response message.

17. A non-transitory computer-readable recording medium storing a program including instructions that, when executed by a processor of a near-Real Time (RT) radio access network (RAN) intelligent controller (RIC) in a wireless communication system, cause the near-RT RIC to perform operations, the operations comprising:

receiving, from an E2 node, an E2 removal request message for removing a signaling connection between the near-RT RIC and the E2 node through an E2 interface; and transmitting, to the E2 node, an E2 removal response message through the E2 interface; and releasing at least one resource associated with removing of the signaling connection between the near-RT RIC and the E2 node, wherein the E2 node comprises an open radio access network (O-RAN) distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

18. A non-transitory computer-readable recording medium storing a program including instructions that, when executed by a processor of an E2 node in a wireless communication system, cause the E2 node to perform operations, the operations comprising:

transmitting, to a near-Real Time (RT) radio access network (RAN) intelligent controller (RIC), an E2 removal request message for removing a signaling connection between the near-RT RIC and the E2 node through an E2 interface;

receiving, from the near-RT RIC, an E2 removal response message through the E2 interface; and releasing at least one resource associated with removing of the signaling connection between the near-RT RIC and the E2 node, wherein the E2 node comprises an open radio access network (O-RAN) distributed unit (O-DU), an O-RAN central unit-control plane (O-CU-CP), an O-RAN central unit-user plane (O-CU-UP), or a base station that communicates with the near-RT RIC via the E2 interface, and wherein the E2 interface provided for communication between the near-RT RIC and the E2 node supports an E2 application protocol (E2AP) for communication over the E2 interface.

* * * * *